(12) United States Patent
St Amant et al.

(10) Patent No.: US 12,417,401 B2
(45) Date of Patent: *Sep. 16, 2025

(54) SYSTEMS, DEVICES, AND/OR PROCESSES FOR BEHAVIORAL CONTENT PROCESSING

(71) Applicant: ARM Ltd., Cambridge (GB)

(72) Inventors: Renee Marie St Amant, Austin, TX (US); Gary Dale Carpenter, Austin, TX (US)

(73) Assignee: ARM Ltd., Cambridge (GB)

( * ) Notice: Subject to any disclaimer, the term of this patent is extended or adjusted under 35 U.S.C. 154(b) by 878 days.

This patent is subject to a terminal disclaimer.

(21) Appl. No.: 15/922,671

(22) Filed: Mar. 15, 2018

(65) Prior Publication Data

US 2019/0287028 A1   Sep. 19, 2019

(51) Int. Cl.
*G06N 20/00* (2019.01)
*H04L 67/306* (2022.01)

(52) U.S. Cl.
CPC ........... *G06N 20/00* (2019.01); *H04L 67/306* (2013.01)

(58) Field of Classification Search
CPC ........ G06N 20/00; G06N 3/08; G06N 3/0454; G06N 3/02; G06N 20/20; H04L 67/306; H04L 67/22; H04L 67/535; H04W 4/38
See application file for complete search history.

(56) References Cited

U.S. PATENT DOCUMENTS

| | | | | |
|---|---|---|---|---|
| 5,337,230 A | * | 8/1994 | Baumgartner | ....... H03K 5/2481 |
| | | | | 700/9 |
| 8,205,066 B2 | * | 6/2012 | Brewer | ............... G06F 9/30036 |
| | | | | 712/34 |
| 9,704,209 B2 | * | 7/2017 | Proud | ..................... G06Q 10/10 |
| 9,724,042 B1 | * | 8/2017 | Lodato | ............... A61B 5/02055 |
| 9,792,397 B1 | * | 10/2017 | Nagaraja | ................. G06F 30/32 |
| 9,997,082 B2 | | 6/2018 | Kaleal | |
| 10,180,339 B1 | * | 1/2019 | Long | ...................... G06N 20/00 |
| 10,321,399 B1 | * | 6/2019 | Bowden | ................. H04W 4/026 |
| 10,671,925 B2 | * | 6/2020 | Chew | ........................ H04L 67/12 |
| 11,301,022 B2 | * | 4/2022 | Alameh | ............ H04M 1/72454 |
| 2004/0113660 A1 | * | 6/2004 | Karasudani | ......... H03M 1/0827 |
| | | | | 326/136 |
| 2004/0133453 A1 | | 7/2004 | Jomini et al. | |
| 2009/0006295 A1 | * | 1/2009 | Angell | .................... G06N 3/004 |
| | | | | 703/2 |

(Continued)

FOREIGN PATENT DOCUMENTS

| | | |
|---|---|---|
| CN | 203438860 U | 2/2014 |
| CN | 2019800294701 | 8/2024 |
| EP | 3293691 A1 | 3/2018 |

OTHER PUBLICATIONS

Georgiev, Petko. "DSP.Ear: Leveraging Co-Processor Support for Continuous Audio Sensing on Smartphones". SenSys '14. Nov. 3-5, 2014. <https://dl.acm.org/doi/10.1145/2668332.2668349> (Year: 2014).*

(Continued)

*Primary Examiner* — Casey R. Garner
(74) *Attorney, Agent, or Firm* — Berkeley Law & Technology Group, LLP

(57) ABSTRACT

Subject matter disclosed herein may relate to systems, devices, and/or processes for processing signals and/or states representative of behavioral content in a computing device.

25 Claims, 9 Drawing Sheets

(56) References Cited

U.S. PATENT DOCUMENTS

| | | | |
|---|---|---|---|
| 2009/0312998 A1 | 12/2009 | Berckmans | |
| 2010/0003653 A1 | 1/2010 | Brown | |
| 2011/0256520 A1 | 10/2011 | Siefert | |
| 2012/0117006 A1* | 5/2012 | Sathish | G06N 20/00 706/12 |
| 2013/0096697 A1* | 4/2013 | Frazer | G05B 19/0426 700/12 |
| 2013/0102852 A1* | 4/2013 | Kozloski | F24F 11/30 600/300 |
| 2013/0219417 A1* | 8/2013 | Gilson | H04H 60/45 725/12 |
| 2014/0112556 A1* | 4/2014 | Kalinli-Akbacak | G06K 9/00302 382/128 |
| 2014/0218187 A1 | 8/2014 | Chun et al. | |
| 2014/0247206 A1* | 9/2014 | Grokop | G06F 1/3287 345/156 |
| 2014/0306821 A1 | 10/2014 | Rahman | |
| 2015/0099255 A1* | 4/2015 | Aslan | G06Q 50/01 434/350 |
| 2015/0313529 A1* | 11/2015 | Nevo | A61B 5/4809 600/595 |
| 2015/0324698 A1* | 11/2015 | Karaoguz | H04L 67/22 706/46 |
| 2015/0332166 A1* | 11/2015 | Ferens | G06N 20/00 706/11 |
| 2016/0001781 A1* | 1/2016 | Fung | G07C 9/37 701/36 |
| 2016/0004224 A1* | 1/2016 | Pi | G04G 21/025 368/10 |
| 2016/0086500 A1* | 3/2016 | Kaleal, III | G06Q 10/10 434/257 |
| 2016/0270717 A1* | 9/2016 | Luna | A61B 5/743 |
| 2016/0350801 A1* | 12/2016 | Vincent | G06N 20/00 |
| 2017/0018008 A1 | 1/2017 | Hajiyev et al. | |
| 2017/0149933 A1* | 5/2017 | Lee | H04L 67/327 |
| 2017/0202509 A1 | 7/2017 | Sanderson | |
| 2017/0213002 A1* | 7/2017 | Jha | A61M 5/1723 |
| 2017/0368936 A1 | 12/2017 | Kojima | |
| 2018/0032126 A1* | 2/2018 | Liu | G06K 9/00302 |
| 2018/0041448 A1* | 2/2018 | Boss | H04L 47/80 |
| 2018/0218123 A1 | 8/2018 | Gomez Sanchez | |
| 2018/0218288 A1* | 8/2018 | Liu | G06F 19/00 |
| 2018/0285463 A1* | 10/2018 | Choi | G06F 16/9535 |
| 2018/0307218 A1* | 10/2018 | Lavid Ben Lulu | G06F 16/90335 |
| 2018/0332062 A1* | 11/2018 | Ford | H04L 63/1441 |
| 2019/0073547 A1* | 3/2019 | el Kaliouby | G06K 9/00302 |
| 2019/0147228 A1* | 5/2019 | Chaudhuri | G06Q 30/0201 382/118 |
| 2019/0147366 A1* | 5/2019 | Sankaran | G06N 3/0445 706/12 |
| 2019/0282155 A1* | 9/2019 | St Amant | A61B 5/165 |
| 2019/0339789 A1* | 11/2019 | Orvis | A61B 5/742 |
| 2020/0211364 A1* | 7/2020 | Kasiviswanathan | G08B 13/19663 |
| 2020/0298005 A1* | 9/2020 | Howard | A61B 5/4836 |
| 2023/0073931 A1* | 3/2023 | Watkins | G06N 3/063 |

OTHER PUBLICATIONS

Robertson, George G. "The Cognitive Coprocessor Architecture for Interactive User Interface". Nov. 1989. <https://dl.acm.org/doi/abs/10.1145/73660.73662> (Year: 1989).*

B. Murmann, D. Bankman, E. Chai, D. Miyashita and L. Yang, "Mixed-signal circuits for embedded machine-learning applications," 2015 49th Asilomar Conference on Signals, Systems and Computers, Pacific Grove, CA, USA, 2015, pp. 1341-1345, doi: 10.1109/ACSSC.2015.7421361. (Year: 2015).*

B. V. Benjamin et al., "Neurogrid: A Mixed-Analog-Digital Multichip System for Large-Scale Neural Simulations," in Proceedings of the IEEE, vol. 102, No. 5, pp. 699-716, May 2014, doi: 10.1109/JPROC.2014.2313565. (Year: 2014).*

U.S. Appl. No. 15/922,644, filed Apr. 12, 2018, 3 pages.

U.S. Appl. No. 15/922,644 / Non-Final Rejection, Sep. 25, 2018, 15 pages.

U.S. Appl. No. 15/922,644 / Amendment/Req. Reconsideration-After Non-Final Reject, Dec. 21, 2018, 19 pages.

U.S. Appl. No. 15/922,644 / Notice of Allowance and Fees Due, Jan. 31, 2019, 8 pages.

U.S. Appl. No. 15/922,644 / Issue Fee Payment, Apr. 30, 2019, 11 pages.

U.S. Appl. No. 15/922,644 / Response to Amendment under Rule 312, May 20, 2019, 3 pages.

U.S. Appl. No. 15/922,687, filed Apr. 11, 2018, 3 pages.

Notice of Non-Compliant IDS mailed May 16, 2019, U.S. Appl. No. 15/922,644, 1 pg.

Petition to Withdraw from Issue, RCE and Quickpath IDS filed Jun. 21, 2019, U.S. Appl. No. 15/922,644, 15 pgs.

Corrected Notice of Allowability mailed Jun. 26, 2019, U.S. Appl. No. 15/922,644, 5 pgs.

Issue Notification mailed Jun. 12, 2019, U.S. Appl. No. 15/922,644, 1 pg.

Invitation to Pay Additional Fees and, Where Applicable, Protest Fee mailed Jun. 18, 2019, International Application No. PCT/GB2019/050691 4 pgs.

Communication Relating to the Results of the Partial International Search, International Application No. PCT/GB2019/050691 11 pgs.

ETHzurich Wearable devices, Screenshots of youtube video, www.youtube.com/watch?v=Qi34rm0gSZA, retrieved Nov. 28, 2018, 15 pgs.

Restriction Requirement mailed Oct. 8, 2019, U.S. Appl. No. 15/922,687, 6 pgs.

Response to Restriction Requirement filed Dec. 9, 2019, U.S. Appl. No. 15/922,687, 12 pgs.

Non-Final Office Action mailed Dec. 31, 2019, U.S. Appl. No. 15/922,687, 23 pgs.

Response to Non-Final Office Action filed Mar. 31, 2020, U.S. Appl. No. 15/922,687, 35 pgs.

Final Office Action mailed Apr. 15, 2020, U.S. Appl. No. 15/922,687, 16 pgs.

Response to Final Office Action filed Jun. 12, 2020, U.S. Appl. No. 15/922,687, 20 pgs.

U.S. Appl. No. 15/922,644, filed Mar. 15, 2018, 108 pages.

U.S. Appl. No. 15/922,687, filed Mar. 15, 2018, 134 pages.

Response to Final Office Action, U.S. Appl. No. 15/922,687, filed Jun. 12, 2020, 20 Pages.

Advisory Action, U.S. Appl. No. 15/922,687, Mailed Jun. 29, 2020, 9 Pages.

RCE/Amendment, U.S. Appl. No. 15/922,687, filed Jul. 15, 2020, 26 Pages.

Office Action, U.S. Appl. No. 15/922,687, Mailed Sep. 22, 2020, 21 Pages.

ETHzürich Wearable devices, Screenshots of youtube video, www.youtube.com/watch?v=Qi34rm0gSZA, retrieved Nov. 28, 2018, 15 pages.

Response to Final Office Action, U.S. Appl. No. 15/922,687, filed Apr. 5, 2021, 23 Pages.

Advisory Action, U.S. Appl. No. 15/922,687, Mailed May 5, 2021, 10 Pages.

RCE Amendment, U.S. Appl. No. 15/922,687, filed Jun. 4, 2021, 24 Pages.

Response to Office Action, U.S. Appl. No. 15/922,687, filed Dec. 22, 2020, 28 Pages.

Final Office Action, U.S. Appl. No. 15/922,687, Mailed Feb. 4, 2021, 21 Pages.

Office Action, U.S. Appl. No. 15/922,687, Mailed Jun. 28, 2021, 16 Pages.

Response to Office Action, U.S. Appl. No. 15/922,687, filed Sep. 28, 2021, 19 Pages.

Office Action, App. No. 201980029470.1, Mailed Jan. 11, 2024, 29 pages.

Response to Office Action, App. No. 201980029470.1, Filed May 10, 2024, 18 pages.

(56) References Cited

OTHER PUBLICATIONS

Notice of Registration, App. No. 201980029470.1, Mailed May 24, 2024, 5 pages.

* cited by examiner

SYSTEMS, DEVICES, AND/OR PROCESSES FOR BEHAVIORAL CONTENT PROCESSING

RELATED APPLICATIONS

This patent application is related to U.S. Ser. No. 10,373, 466, entitled Systems, Devices, and/or Processes for Tracking Behavioral and/or Biological State and U.S. Ser. No. 15/922,687 entitled Systems, Devices, and/or Processes for Behavioral and/or Biological State Processing, all filed herewith, and all hereby incorporated by reference in their entirety.

BACKGROUND

Field

Subject matter disclosed herein may relate to systems, devices, and/or processes for processing signals and/or states representative of behavioral content in a computing device.

Information

Integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes. With an abundance of diverse content being accessible, signal and/or state processing techniques continue to evolve. At times, however, processing signals and/or states representative of diverse content may prove to be relatively resource-demanding, which may present a number of challenges including, for example, increased processing time, storage demands, complexity, cost, and/or the like.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
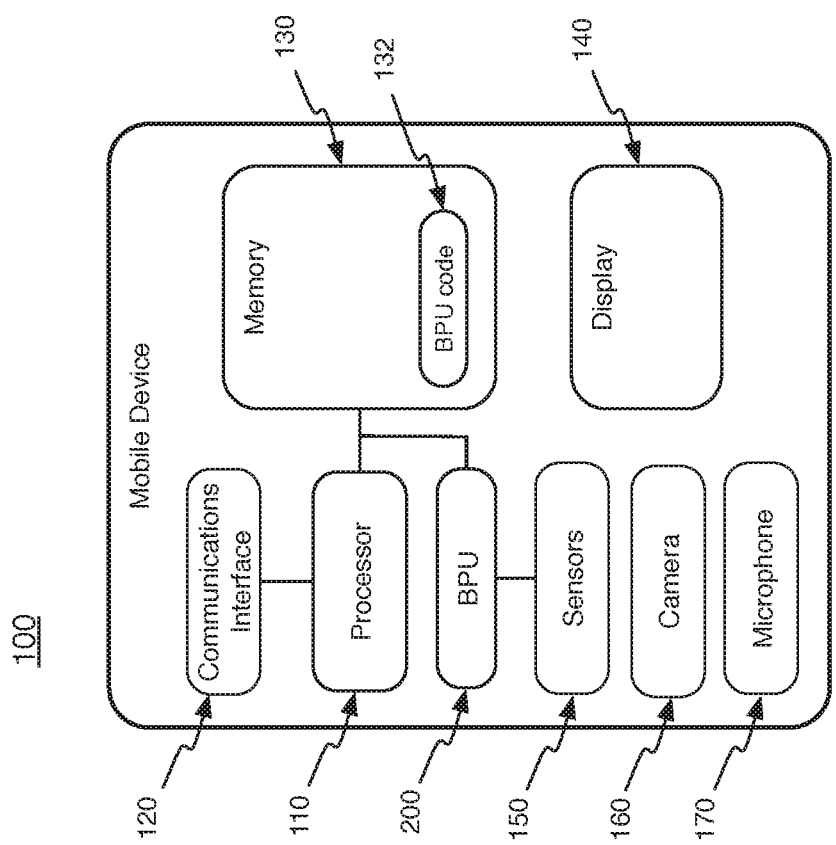
FIG. 1 is an illustration of an example mobile device, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes. With an abundance of diverse content being accessible, signal and/or state processing techniques continue to evolve. At times, however, processing signals and/or states representative of diverse content may prove to be relatively resource-demanding, which may present a number of challenges including, for example, increased processing time, storage demands, complexity, cost, and/or the like.

In some situations, machines may be human directed and/or operated. In some situations, human operators and/or users may make decisions, including relatively significant decisions, related to the operation of machines. An operator's decision-making and/or performance abilities may be affected, however, depending at least in part on the operator's physical, mental, and/or emotional state, for example. In some situations, decision-making with respect to operation of particular machines may be shifted, at least in part, to machines, such as computing devices, for example. In an embodiment, decision-making performed at least in part by machines, such as computing devices, with respect to operation of a particular machine may be based, at least in part, on an operator's physical, mental, and/or emotional state.

In an embodiment, content, such as may be obtained from one or more sensors, for example, may be processed to generate content, such as behavioral profile content, for a particular operator. Further, in an embodiment, content, such as behavioral profile content for a particular operator, may be processed to generate recommendations, for example, with respect to a particular operator, and/or to make decisions with respect to operation of a particular machine. For example, content obtained at least in part via one or more sensors may be processed to generate behavioral profile content for a particular operator, and/or such a behavioral profile content may be utilized, at least in part, to affect operation of a particular machine. In other embodiments, content, such as behavioral profile content for a particular operator, may be processed to generate recommendations for a particular operator directed to the particular operator's behavioral and/or biological state and/or to generate customized content for consumption by the particular operator, to name but a couple non-limiting examples.

In an embodiment, content obtained from one or more sensors may be processed by particular hardware circuitry to generate behavioral profile content representative of a particular operator's physical, mental, and/or emotional state. For example, a processor, such as a behavioral processing unit, may be dedicated, at least in part, to processing sensor content to generate behavioral profile content representative of a particular operator's physical, mental, and/or emotional state. A processor, such as a behavioral processing unit, may include particular circuitry directed to performing particular operations to relatively more efficiently process sensor content to generate behavioral profile content for a particular operator, in an embodiment. For example, in an embodiment, a processor, such as a behavioral processing unit, may include machine learning acceleration circuitry directed to performing particular operations that may relatively more efficiently operate on sets of parameters, such as multidimensional sets of parameters, that may be utilized in various machine learning techniques such as, for example, neural networks, as discussed more fully below. In an embodiment, a processor, such as a behavioral processing unit, may comprise a co-processor, for example, that may operate in cooperation with a general-purpose processor, although claimed subject matter is not limited in this respect.

The terms "operator" and/or "user" refers to human individuals, and/or may be utilized herein interchangeably. In an embodiment, an operator and/or user may operate a machine, although subject matter is not limited in scope in these respects. Further, as utilized herein, "machine" refers to an article of manufacture, such as, for example, a mechanically, electrically, and/or electronically operated device for performing a task. In some embodiments, operation of a machine may be performed by a combination of an operator and/or a computing device, and/or operation of a machine may be based at least in part on a behavioral profile of at least one particular operator, as explained more fully herein.

As utilized herein, "behavioral profile content" and/or the like refers to one or more parameters representative of a current behavioral state or biological state, or a combination thereof, for at least one particular operator. Thus, for example, "behavioral profile content" and/or the like is not limited to merely behavioral aspects of a particular operator's current state, but may also include parameters representative of one or more biological aspects with respect to a particular operator, as explained more fully herein. Further, although some embodiments herein may be described in connection with "an" operator and/or "a" particular operator, subject matter is not limited to a single operator. For example, at least some embodiments may include behavioral profile content for one or more operators, although, again, claimed subject matter is not limited in scope in these respects.

Further, as utilized herein, the term "current" and/or the like refers to substantially and/or approximately current with respect to a point in time. For example, a "current" behavioral and/or biological state of a particular operator refers to a behavioral and/or biological state for the particular operator derived at least in part from relatively recent sensor content. For example, in an embodiment, behavioral profile content for a particular operator may be representative of a behavioral and/or biological state of the particular operator derived at least in part from sensor content obtained from one or more sensors within fractions of a second of being generated.

FIG. 1 is an illustration of an embodiment 100 of an example mobile device. In an embodiment, a mobile device, such as 100, may comprise one or more processors, such as processor 110 and/or behavioral processing unit (BPU) 200, and/or may comprise one or more communications interfaces, such as communications interface 120. In an embodiment, one or more communications interfaces, such as communications interface 120, may enable wireless communications between a mobile device, such as mobile device 100, and one or more other computing devices. In an embodiment, wireless communications may occur substantially in accordance any of a wide range of communication protocols, such as those mentioned herein, for example.

In an embodiment, a mobile device, such as mobile device 100, may include a memory, such as memory 130. In an embodiment, memory 130 may comprise a non-volatile memory, for example. Further, in an embodiment, a memory, such as memory 130, may have stored therein executable instructions, such as for one or more operating systems, communications protocols, and/or applications, for example. A memory, such as 130, may further store particular instructions, such as BPU code 132, executable by a behavioral processing unit, such as 200, to generate, at least in part, behavioral profile content. Further, in an embodiment, a mobile device, such as mobile device 100, may comprise a display, such as display 140, one or more sensors, such as one or more sensors 150, one or more cameras, such as one or more cameras 160, and/or one or more microphones, such as microphone 170, for example.

Although BPU 200 is described as executing instructions, such as BPU code 132, other embodiments of behavioral processing units may not fetch and execute code. In an embodiment, a behavioral processing unit may include dedicated and/or specialized circuitry for processing sensor content and/or for generating behavioral profile content, as described more fully below.

As utilized herein, "sensors" and/or the like refer to a device and/or component that may respond to physical stimulus, such as, for example, heat, light, sound pressure, magnetism, particular motions, etc., and/or that may generate one or more signals and/or states in response to physical stimulus. Thus, although camera 160 and/or microphone 170 are depicted in FIG. 1 as separate from sensors 150, the term "sensor" and/or the like may include microphones and/or cameras, in an embodiment. Example sensors may include, but are not limited to, one or more accelerometers, gyroscopes, thermometers, magnetometers, barometers, light sensors, proximity sensors, hear-rate monitors, perspiration sensors, hydration sensors, breath sensors, etc., and/or any combination thereof. In an embodiment, one or more sensors may monitor one or more aspects of a particular operator's biological and/or behavioral state.

In an embodiment, to generate behavioral profile content for a particular operator, a computing device, such as mobile device 100, may obtain signals and/or states representative of content from one or more sensors, such as one or more of sensors 150, camera 160, and/or microphone 170, or any combination thereof. Also, in an embodiment, a processor, such as behavioral processing unit 200, may process sensor content, such as content from one or more of sensors 150, camera 160, and/or microphone 170, or any combination thereof, to generate behavioral profile content for a particular operator. In an embodiment, a processor, such as behavioral processing unit 200, may include behavioral content processing circuitry. For example, a processor, such as behavioral processing unit 200, may include machine learning acceleration circuitry, in an embodiment.

For example, a processor, such as behavioral processing unit 200, may include one or more arithmetic units directed to operations involving relatively larger parameter sets, such as parameter sets that may be employed in machine learning, such as neural networks. In an embodiment, machine learning acceleration circuitry, such as arithmetic units directed to operations involving neural network parameter sets and/or other relatively larger parameter sets, may be utilized to process sensor content to generate behavioral profile content for a particular operator. In an embodiment, behavioral profile content may be utilized to affect operation of a particular machine, to generate recommendations for a particular operator directed to the particular operator's behavioral and/or biological state, to generate customized content for consumption by the particular operator, etc., to name but a few non-limiting examples.

In an embodiment, a general-purpose processor, such as processor 110, and a behavioral processing unit, such as 200, may comprise separate integrated circuit devices. In other embodiments, a general-purpose processor, such as processor 110, and a behavioral processing unit, such as 200, may be formed on the same integrated circuit die and/or integrated circuit package. Further, in an embodiment, a processor, such as behavioral processing unit 200, may comprise a co-processor that may operate in cooperation with a general purpose processor, such as 110. For example, a processor, such as 110, may execute code comprising operating systems, applications, etc. Also, in an embodiment, a behavioral processing unit, such as 200, may perform operations dedicated to generating behavioral profile content for one or more operators. For example, a behavioral processing unit, such as 200, may include circuitry for relatively more efficiently executing particular instructions and/or instructions sets, such as code 132, for operating on relatively larger parameters sets, such as may be utilized in connection with particular machine learning techniques, including, for example, neural networks.

In an embodiment, behavioral profile content, such as may be generated by a behavioral processing unit, such as 200, may be communicated between a behavioral processing unit, such as 200, as any of a wide range of devices, systems, and/or processes. For example, behavioral profile content generated by behavioral processing unit 200 may be stored in a memory, such as 130, and/or may be pushed and/or otherwise made available to processor 110 and/or to other devices and/or systems. In an embodiment, behavioral profile content may be communicated via one or more wired and/or wireless communication networks between a computing device, such as mobile device 100, and one or more other network devices, such as one or more other computing devices. Of course, subject matter is not limited in scope in these respects.

In an embodiment, behavioral profile content may include a particular specified set of parameters representative of a particular operator's behavioral and/or biological state that may be utilized, at least in part, by any of a wide range of devices, systems, and/or processes for any of a wide range of applications and/or purposes. In an embodiment, by generating a specified set of parameters comprising behavioral profile content, other devices, systems, applications, and/or processes, for example, may be relieved of responsibility for generating behavioral profile content and may, instead, concentrate on particular areas of expertise and/or specialization. For example, application developers may design applications to take advantage of one or more parameters of behavioral profile content for one or more particular operators without having to incur the costs (time, money, resources, etc.) of developing circuitry, code, etc. for gathering and/or processing sensor content and/or for generating behavioral profile content.

Although FIG. 1 depicts an embodiment of a mobile device, such as mobile device 100, other embodiments may include other types of computing devices. Example types of computing devices may include, for example, any of a wide range of digital electronic devices, including, but not limited to, desktop and/or notebook computers, high-definition televisions, digital video players and/or recorders, game consoles, satellite television receivers, cellular telephones, tablet devices, wearable devices, personal digital assistants, mobile audio and/or video playback and/or recording devices, or any combination of the foregoing.

Figure 2:
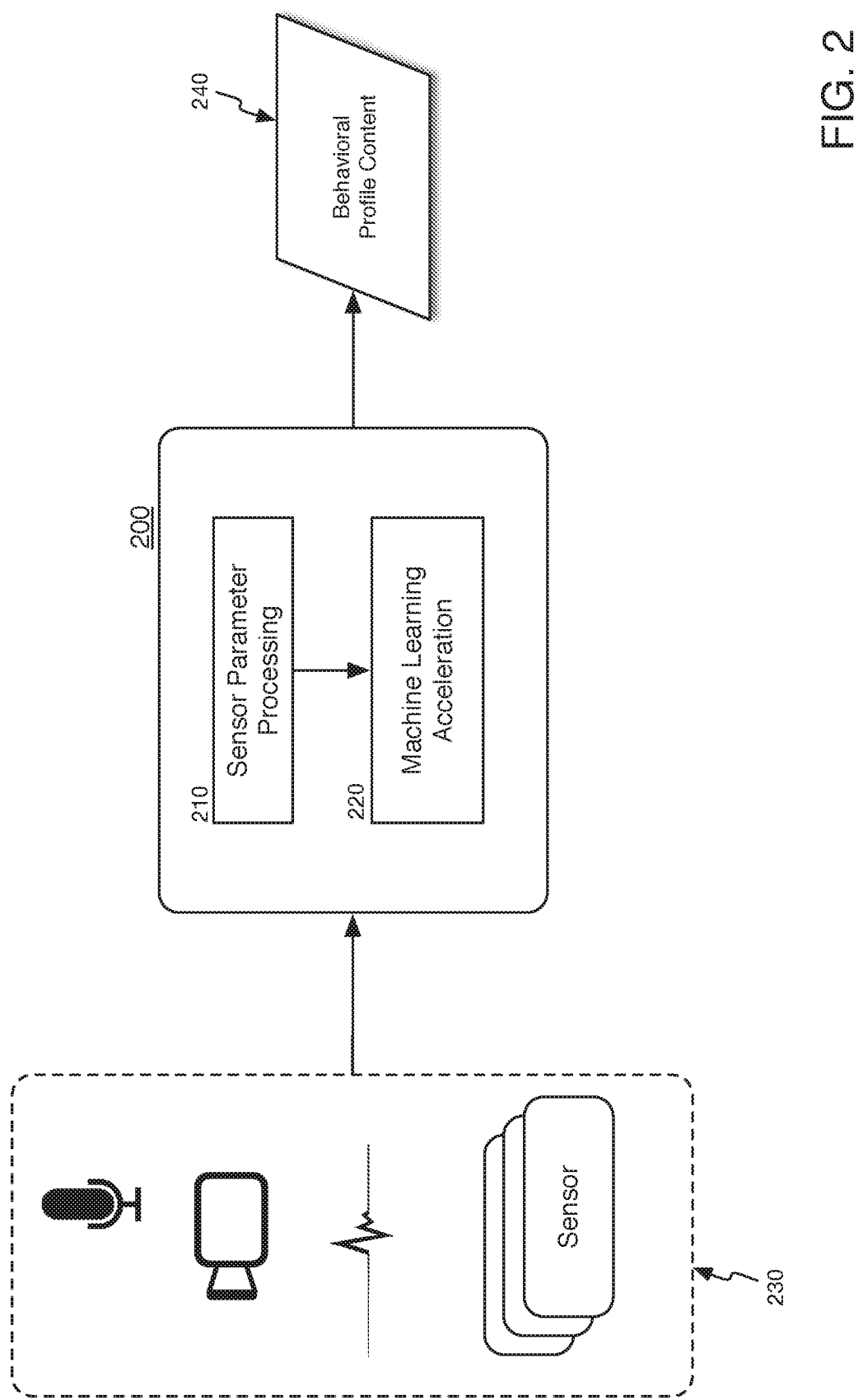
FIG. 2 is an illustration of an example processor for processing signals and/or states representative of behavioral content in a computing device, in accordance with an embodiment.

FIG. 2 is an illustration of an embodiment 200 of a processor, such as a behavioral processing unit, to process signals and/or states representative of behavioral content in a computing device. In an embodiment, to generate behavioral profile content, such as behavioral profile content 240, for a particular operator, a processor, such as behavioral processing unit 200, may obtain signals and/or states representative of content from one or more sensors, such as one or more of sensors 230. Also, in an embodiment, a processor, such as behavioral processing unit 200, may process sensor content, such as content from one or more of sensors 230, to generate behavioral profile content, such as behavioral profile content 240, for a particular operator. For example, a processor, such as behavioral processing unit 200, may include sensor parameter processing circuitry, such as circuitry 210, and/or may include machine learning acceleration circuitry, such as circuitry 220, in an embodiment.

In an embodiment, a processor, such as behavioral processing unit 200, may comprise circuitry to generate, at least in part, behavioral profile content, such as behavioral profile content 240, for a particular operator of technology to be utilized, for example, as additional input into machine-based decision making. For example, a processor, such as behavioral processing unit 200, may relatively more efficiently process signals and/or states obtained from one or more behavioral, biological, and/or environmental sensors, or a combination thereof, associated with a particular operator. In an embodiment, a processor, such as behavioral processing unit 200, may calculate probabilities and/or likelihoods, for example, for "hidden" (e.g., emotional) states of a particular operator by generating behavioral profile content, such as 240, that may be utilized by one or more computing devices, systems, and/or processes for any of a wide range of possible purposes. For example, behavioral profile content may be utilized to affect operation of a particular machine, to generate recommendations for a particular operator directed to the particular operator's behavioral and/or biological state, to generate customized content for consumption by the particular operator, etc., to name but a few non-limiting examples. Behavioral profile content may be stored, for example, in one or more memories, such as memory 130, in an embodiment.

In an embodiment, machine-based decision-making, such as based at least in part on behavioral profile content, may include dynamic content creation and/or may include physical control of devices which may affect the safety of a particular operator and/or other users and/or individuals. In an embodiment, sensor content may comprise content from any of a wide range of possible sources and/or that may be variable. In an embodiment, a processor, such as a behavioral processing unit, may incorporate machine-learning (e.g., neural networks, etc.) at least in part to adapt to the presence and/or absence of one or more particular sensors while providing probabilities and/or likelihoods represented at least in part by behavioral profile content.

In an embodiment, machine-based decision-making, for example, may depend at least in part on an operator's current state and/or the operator's ability to relatively quickly respond to changes in the operator's state. A wide range of possible sensor types may provide content representative of various aspects of a particular operator's biological and/or behavioral state, and/or representative of one or more environmental factors and/or other external factors. In an embodiment, a processor, such as behavioral processing unit 200, may include a sensor parameter processing unit, such as 210. In an embodiment, a sensor parameter processing unit, such as 210, may obtain signals and/or states from one or more sensors, such as 230, and/or may process signals and/or states from one or more sensors to combine, coordinate, normalize and/or otherwise condition signals and/or states from one or more sensors.

For example, a sensor parameter processing unit, such as 210, may prepare sensor content for further processing, such as via machine learning operations. In an embodiment, machine learning acceleration circuitry, such as 220, may, at least in part, process sensor content to infer a substantially current biological and/or behavioral state of a particular operator. For example, a camera sensor and/or the like may provide one or more signals and/or states to a sensor parameter processing unit, such as 210. Sensor parameter processing unit 210 may generate one or more parameters representative of pupil dilation, focal point, blink duration, and/or blink rate, or any combination thereof, for example. In an embodiment, a processor, such as 200, including machine learning circuitry, such as machine learning acceleration circuitry 220, may generate behavioral profile content, such as 240, from one or more sensor parameters, such as one or more of pupil dilation, focal point, blink duration, and/or blink rate, or any combination thereof, for example. Of course, subject matter is not limited in scope in these respects.

In an embodiment, machine learning acceleration circuitry, such as 220, may generate, at least in part, a representation of a particular operator's biological and/or behavioral state, such as behavioral profile content 240. In an embodiment, behavioral profile content, such as behavioral profile content 240, may comprise a specified set of parameters that may be utilized by any of a wide range of machine-based (e.g., computing device-based) decision making systems, devices, and/or processes. In an embodiment, behavioral profile content may include a plurality of parameters representative of focal point, excitement, anger, fear, fatigue, dehydration, or focus/distraction, or any combination thereof, in relation to a particular operator. Behavioral profile content may further include, by way of additional non-limiting examples, parameters representative of pre-breakthrough, silent like, regret/error acknowledgment, hunger, sloppiness/precision, empathy, and/or social engagement level, or any combination thereof.

In an embodiment, a processor, such as behavioral processing unit 200, may repetitively obtain sensor content and/or may repetitively generate behavioral profile content for a particular operator. For example, sensor content may be gathered and/or otherwise obtained at specified and/or regular intervals, and/or behavioral profile content may be generated at specified and/or regular intervals. In an embodiment, a computing device-based decision-making system, device, and/or process may track behavioral profile content over a period of time, for example, such as to detect changes in behavioral profile content.

In an embodiment, a processor, such as behavioral processing unit 200, may include resources dedicated, at least in part, to processing sensor content, for example, and/or to generating behavioral profile content, such as 240, for a particular operator. Further, by generating a specified set of parameters comprising behavioral profile content, such as 240, decision-making systems, devices, and/or processes may be relieved of responsibility for generating behavioral profile content and may, instead, concentrate on particular areas of expertise and/or specialization, for example. Further, development costs may be reduced for decision-making systems, devices, and/or processes at least in part due to having a specified set of behavioral profile content parameters available from a processor, such as behavioral processing unit 200.

In an embodiment, a processor, such as behavioral processing unit 200, may merge substantially real-time sensor content (e.g., behavioral and/or biological sensor content, or a combination thereof) with representations of prior relationships (e.g., known and/or determined connections between that which may be measured and/or human states). Also, in an embodiment, a processor, such as behavioral processing unit 200, may utilize machine learning techniques (e.g., neural networks, etc.) to map incoming sensor content representative of one or more aspects of an operator's biological and/or behavioral state. In an embodiment, a processor, such as behavioral processing unit 200, may include support for relatively more efficient coordination and/or processing of content obtained from a wide range of possible sources (e.g., combination of content from biological and/or behavioral sensors and/or content representative of other factors) to generate a specified set of parameters, such as behavioral profile content 240. Further, in an embodiment, one or more memory devices may be provided to store operator-dependent and/or operator-independent content to enable relatively quicker identification of state changes in a particular operator.

Embodiments may find advantageous use in any of a wide range of applications and/or subject areas. For example, embodiments may be utilized in situations that may benefit from substantially real-time determination of a biological and/or behavioral state of a particular operator, including, for example, technology-assisted driving and/or flying, such as in commercial and/or military scenarios. For example, as described more fully below, responsibility for decision-making with respect to operation of a particular machine may shift from operator to computing device depending, at least in part, on a current biological and/or behavioral state of a particular operator. For example, if a processor, such as behavioral processing unit 200, detects at least in part via sensor content that a particular operator, such as a pilot, is growing fatigued, one or more aspects of machine operation, such as flight controls, may be shifted from operator control to computing device control.

In another example embodiment, behavioral profile content, such as 240, may be utilized, at least in part, to evolve and/or tailor virtual reality and/or gaming content to be consumed by a particular operator based, at least in part, on a current biological and/or behavioral state of the particular operator. In this manner, for example, content may be customized for a particular operator to relatively more effectively induce a desired state in the particular operator.

For example, in an embodiment, content from one or more cameras pointed at an operator's eyes, a microphone, a skin sensor to measure perspiration and/or temperature, one or more pressure sensors for the operator's fingers, a heart rate monitor, a hydration sensor, and/or a breath monitor, or any combination thereof, may be utilized as part of an immersive gaming system. In an embodiment, a processor, such as behavioral processing unit 200, may obtain content from one or more sensors, such as one or more sensors mentioned above, and/or may generate a set of parameters representative of a substantially current biological and/or behavioral state for a particular operator. For example, sensor content obtained via a camera, for example, may be processed to generate behavioral profile content for a particular operator representative of pupil dilation, focal point, blink duration, and/or blink rate. Further, digital audio content, such as may be obtained via a microphone, for example, may be processed to generate behavioral profile content representative of volume, tone, and/or sentiment.

In an embodiment, machine learning operations such as may be performed by a processor, such as behavioral processing unit 200, for example, may store operator-specific content in one or more memory devices, such as 130, and/or may also store user-generic content (e.g., determined and/or substantially known relationships between sensor content and/or user states). In an embodiment, operator-specific content and/or user-generic content may be processed, such as via machine learning operations, to generate one or more output state vectors, such as behavioral profile content 240.

In an embodiment, determined and/or substantially known relationships, such as relationships between sensor content and/or operator states, may include scientifically determined relationships. For example, pupil dilation may be linked with dopamine release according to one or more scientific publications, such from the National Institute of Health (NIH). Further, for example, dopamine release may be linked with anticipation and relatively heightened emotional response to stimulus according to one or more scientific studies, such as may be published by Nature research journal. In an embodiment, in addition to scientifically determined relationships, other relationships may be determined offline through content collection and/or machine learning. For example, test subjects, such as one or more users and/or operators, may provide behavioral and/or biological state content and/or may provide biological and/or behavioral marker content so that relationships between such biomarkers and behavioral and/or biological state content may be determined. In an embodiment, biomarkers may be recorded for test subjects as they are presented with content that aims to evoke a particular state, for example. Via machine learning, in an embodiment, a variety of states may be learned to be identified through biological and/or behavioral markers. Such learned relationship content may be transferred to a processor, such as behavioral processing unit 200, for use in relatively more efficient on-chip inference and/or determination of operator state.

In an embodiment, through a combination of content from one or more sensors, knowledge of determined and/or substantially known correlations and/or relationships, and/or machine learning, a processor, such as behavioral processing unit 200, may generate parameters representative of a substantially current behavioral and/or biological state of a particular operator. In an embodiment, behavioral profile content, such as 240, may include one or more parameters indicative of scores, such as for operator states such as anger, excitement, fatigue, distraction, etc. Further, utilization of relatively larger amounts of content from sensors may allow for improvements in an operator state and/or may allow for better differentiation between operator states. For example, in an embodiment, fear and/or excitement may both increase heart rate, but fear, without excitement, may result in restriction in an operator's shoulders. A behavioral processing unit, such as 200, may differentiate between an operator's fear and/or excitement based at least in part on content obtained from one or more cameras, in an embodiment.

As mentioned, in an embodiment, a gaming system may utilize behavioral profile content for a particular operator to evolve content within a game such that the game may be tailored to produce a desired effect in the particular operator. For example, a behavioral processing unit, such as 200, may detect, based at least in part on behavioral profile content, a drop in an operator's level of excitement. In an embodiment, a gaming system may respond to a drop in excitement level at least in part by altering content presented to the operator in an attempt to grab the operator's interest and/or to otherwise create an increase in operator interest level. A behavioral processing unit may continue to track a current state for the particular operator, and/or a gaming system may provide particular gaming content to the particular operator based at least in part on detected changes in the particular operator's substantially current biological and/or behavioral state, in an embodiment.

In an embodiment, a processor, such as behavioral processing unit 200, may incorporate inputs obtained from one or more relatively newer sensors, such as to improve generation of behavioral profile content, for example. In an embodiment, relatively newer sensors may be incorporated as relatively newer materials and/or sensors become available.

In an embodiment, a processor, such as behavioral processing unit 200, may generate behavioral profile content that may include one or more parameters indicative of user anger, for example. In an embodiment, incorporation of parameters indicative of anger, for example, may add relatively significant value to at least some example systems, devices, and/or processes. For example, an insurance company may adjust premiums based at least in part on an operator's anger levels. In another embodiment, as a safety measure, a processor, such as behavioral processing unit 200, implemented in an automobile, for example, may prevent the automobile from starting in situations where driver anger levels exceed a specified threshold.

In other embodiments, digital audio content providers, such as Pandora® and/or Spotify®, for example, may select and/or evolve content to present to a particular user and/or operator based at least in part on behavioral profile content obtained from a processor, such as behavioral processing unit 200, rather than basing such determinations on explicit and/or limited "like" or "dislike" inputs obtained from a user. In other embodiments, recommendations may be provided to an operator, such as a gamer, to improve operator wellness based at least in part on behavioral profile content. For example, if a decision-making system, device, and/or process determines from behavioral profile content that an operator may be dehydrated, a message may be displayed and/or otherwise communicated to the operator as a reminder to take a break and/or to seek nourishment.

Other embodiments may involve law enforcement and/or military applications. For example, weapons may be deactivated at least in part in response to detection of particular operator states, as indicated, for example, by behavioral profile content. However, these are merely several examples of how behavioral profile content may be utilized to advantage in a few example situations, and subject matter is not limited in these respects.

Figure 3:
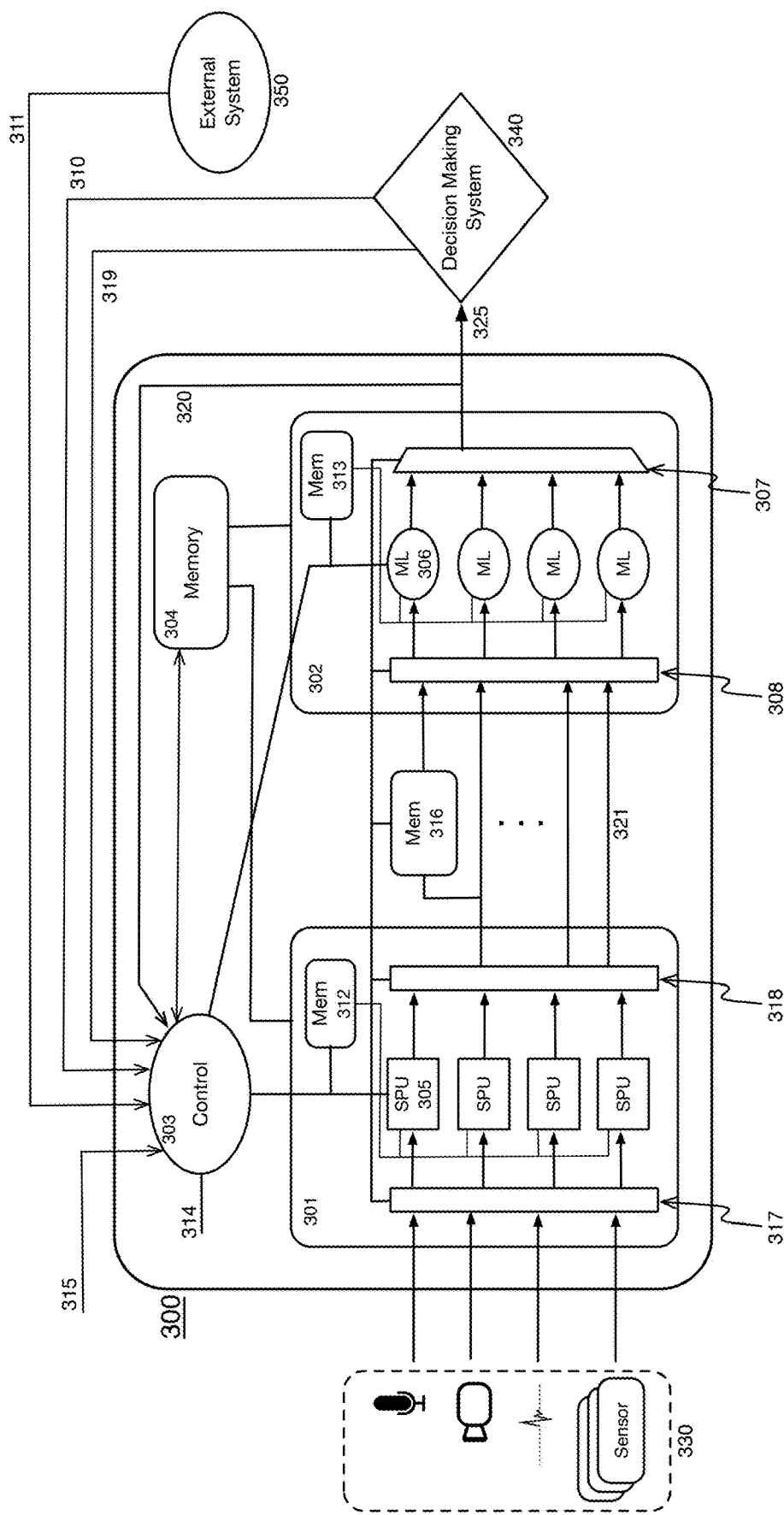
FIG. 3 is a schematic block diagram depicting an example processor for processing signals and/or states representative of behavioral profile content in a computing device, in accordance with an embodiment.

FIG. 3 is a schematic block diagram depicting an embodiment 300 of an example device, such as a behavioral processing unit, for processing signals and/or states representative of behavioral content in a computing device. In an embodiment, a processor, such as behavioral processing unit 300, may process digital signals and/or states or analog signals and/or states, or a combination thereof (e.g., mixed-signal). Any of a wide range of digital and/or analog circuit types may be utilized to process digital, analog, and/or mixed-signal signals and/or states, as explained more fully below. In an embodiment, one or more aspects of a processor, such as behavioral processing unit 300, may be implemented to operate in an analog domain, while one or more other aspects may be implemented to operate in a digital domain. In other embodiments, a processor, such as behavioral processing unit 300, may be implemented to operate substantially wholly in the digital domain and/or the analog domain.

In an embodiment, a processor, such as behavioral processing unit 300, may, in general, substantially continuously obtain content from sensors, such as one or more sensors 330, and/or may substantially continuously generate output signals and/or states, such as behavioral profile content 325. Generated output signals and/or states, such as behavioral profile content 325, may be made available to one or more decision-making systems, such as decision-making system 340, for example.

In an embodiment, a sensor parameter processing stage, such as sensor parameter processing stage 301, may obtain signals and/or states (e.g., digital, analog, and/or mixed-signal) from one or more sensors, such as sensors 330. In an embodiment, a sensor parameter processing stage, such as sensor parameter processing stage 301, may process signals and/or states from one or more sensors at least in part by combining content, adjusting timing, performing noise reductions and/or other signal reduction operations, normalizing content, or any combination thereof, for example. However, claimed subject matter is not limited in scope in this respect.

Further, in an embodiment, sensor content steering circuitry, such as sensor content steering circuitry 317, may direct signals and/or states obtained from sensors, such as from sensors 330, to one or more sensor processing units, such as one or more of sensor processing units (SPU) 305. In an embodiment, sensor processing units, such as SPUs 305, may be configured via one or more control signals, such as control signals communicated between a control unit, such as control unit 303, and sensor processing units, such as SPUs 305. Sensor processing units, such as SPUs 305, may prepare sensor content, such as signals and/or stated obtained from one or more sensors, such as sensors 330, for further processing by, for example, a machine-learning processing stage, such as machine-learning processing stage 302. In an embodiment, sensor content steering circuitry, such as sensor content steering circuitry 317, may direct content based, at least in part, on one or more control signals obtained from a control unit, such as control unit 303, and/or from a memory, such as memory 312, for example.

In an embodiment, a sensor processing stage, such as sensor processing stage 301, may include one or more sensor processing units, such as sensor processing units 305, that may be configured to operate individually or in one or more various combinations. Sensor processing units, such as SPUs 305, may perform, individually and/or in cooperation, any of a variety of operations that may be specified and/or implemented. Such operations may include, for example, combining signals and/or states, adjusting timing of signals and/or states, performing noise reductions and/or other signal reduction operations, and/or normalizing content, to list but a few examples.

One or more sensor processing units, such as SPUs 305, may be implemented to operate in an analog domain and/or one or more units may be implemented to operate in a digital domain. In an embodiment, sensors, such as sensors 330, may provide signals and/or states comprising analog signals and/or comprising digital content (e.g., signals and/or states). Further, in an embodiment, one or more analog signals obtained by one or more sensors, such as 330, may be converted to digital content using analog-to-digital conversion circuitry. In other embodiments, analog signals obtained from sensors, such as sensors 330, for example, may be maintained as analog signals for processing by one or more sensor processing units, such as SPUs 305. Further, in an embodiment, individual sensor processing units, such as SPUs 305, may be implemented in analog and/or digital based, at least in part, on particular tasks to be performed by a particular SPU and/or based, at least in part, on particular signal types to be obtained from sensors, such as sensors 330. In an embodiment, one or more of a variety of filters, signal amplifiers, and/or signal damping circuits, ranging from relatively more simple to relatively more complex, for example, may be performed by one or more particular sensor processing units, such as SPUs 305. Sensor processing unit operations, such as example operations mentioned herein, may have particular relevance in a larger context of behavioral profile content generation in connection with one or more machine-learning units. For example, sensor processing unit operations may be performed with an end-goal of behavioral profile content generation in mind.

In an embodiment, a particular sensor processing unit, such as SPU 305, may include noise reduction, filtering, dampening, combining, amplifying circuitry, etc., for example, implemented to operate in the analog domain. Analog circuitry may include, for example, one or more op-amps, transistors, capacitors, resistors, etc., although claimed subject matter is not limited in scope in this respect. Circuitry, such as noise reduction, filtering, dampening, combining, amplifying circuitry, etc., for example, may also be implemented in the digital domain, or in a combination of analog and/or digital. For another example, a particular sensor processing unit, such as a particular SPU 305, may be implemented in analog and/or digital to combine signals and/or states. In an embodiment, a unit to combine signals and/or states may be implemented in the analog domain or in the digital domain, or a combination thereof. In an embodiment, analog hysteretic "winner-take-all" circuits may be implemented at least in part to improve noise robustness and/or to mitigate, at least in part, timing difference between sensor input streams, for example. Of course, subject matter is not limited in scope in these respects. Further, noise reduction, filtering, dampening, combining, and/or amplifying are merely example tasks that may be performed by one or more sensor processing units, such as SPUs 305, and, again, claimed subject matter is not limited in scope in these respects.

Further, in an embodiment, sensor processing units, such as SPU 305, may be implemented to generate outputs that may exhibit a range of approximation, imprecision, and/or non-replicability. In an embodiment, machine-learning units, such as ML 306, may help mitigate consequences that might otherwise occur due to approximation, imprecision, and/or non-replicability potentially exhibited by sensor processing units, such as SPU 305. As utilized herein, "replicable" in the context of sensor processing units, such as SPU 305, refers to an ability to generate the same output for a given duplicate set of inputs. "Non-replicability" in this context refers to one or more sensor processing units, such as SPU 305, not necessarily generating the same output for a given duplicate set of inputs. That is, in an embodiment, one or more sensor processing units, such as SPU 305, may be implemented in a manner so as to not guarantee similar outputs for similar sets of inputs.

In an embodiment, content steering circuitry, such as content steering circuitry 318, may direct content, such as signals and/or states, generated by one or more sensor processing units, such as SPUs 305, to a machine-learning stage, such as machine-learning stage 302. Content, such as signals and/or states 321, generated by one or more sensor processing units, such as SPUs 305, may also be stored, at least temporarily, in a memory, such as memory 316, for example. In an embodiment, memory 316 may comprise a buffer, such as a first-in, first-out buffer, for example, although claimed subject matter is not limited in scope in this respect. In an embodiment, content steering circuitry, such as content steering circuitry 318, may direct content based, at least in part, on one or more control signals obtained from a control unit, such as control unit 303, and/or from a memory, such as memory 312, for example.

A machine-learning stage, such as machine-learning stage 302, may include content steering circuitry, such as content steering circuitry 308, that may direct content, such as signals and/or states 321, obtained from a sensor processing stage, such as sensor processing stage 301, to one or more machine-learning units (ML), such as machine-learning units 306, for example. In an embodiment, content steering circuitry, such as content-steering circuitry 308, may direct content, such as signals and/or states 321, based, at least in part, on one or more control signals obtained from a control unit, such as control 303, and/or from a memory, such as memory 313.

In an embodiment, machine-learning units, such as machine-learning units 306, may be configured via one or more control signals, such as control signals communicated between a control unit, such as control unit 303, and machine-learning units, such as machine-learning units 306. In an embodiment, one or more machine-learning units, such as machine-learning units 306, may be configured to operate individually or in one combination with one or more other machine-learning units. In an embodiment, individual machine-learning units, such as machine-learning units 306, may implement particular machine-learning techniques. Further, one or more machine-learning units, such as machine-learning units 306, may be implemented to operate in the analog domain or in the digital domain, or a combination thereof. For example, a machine-learning unit operating in the analog domain may include voltage and/or current summing circuits to sum a number of signals and/or states and/or may include devices, such as variable impedance devices, that may apply weighting factors to individual signals and/or states. Of course, claimed subject matter is not limited in scope in these respects.

Content steering/selecting circuitry, such as content steering/selecting circuitry 307, may select and/or combine content generated by one or more machine-learning units, such as machine-learning units 306, in an embodiment. Further, content steering/selecting circuitry, such as content steering/selecting circuitry 307, may direct output, such as signals and/or states representative of behavioral profile content 325, to a decision-making system, such as decision-making system 340. In an embodiment, a control unit, such as control unit 303, may obtain at least a portion of the output generated by machine-learning units, such as machine-learning units 306.

In an embodiment, control unit, such as control unit 303, may configure and/or control one or more aspects of behavioral processing unit 300. In an embodiment, a control unit, such as control unit 303, may obtain inputs from a variety of sources and/or may control various aspects of behavioral processing unit 300 based, at least in part, on the obtained inputs. In an embodiment, control unit inputs may be obtained from units within behavioral processing unit 300 unit itself and/or from one or more other sources. For example, control unit 303 may obtain user parameters 315 (e.g., user ID or other parameters descriptive of a particular user). In an embodiment, user parameters, such as parameters 315, may be obtained from one or more external sources and/or may be obtained from one or more memories within behavioral processing unit 300. For example, user parameters for one or more particular users may be stored in a memory, such as memory 304. Various aspects of behavioral processing unit 300 may be configured and/or reconfigured based at least in part on parameters that may be stored on an individual user basis in a memory, such as memory 304. For example, a control unit, such as control unit 303, may communicate with a memory, such as memory 304, to obtain configuration content for a particular user from memory 304, and/or may configure behavioral processing unit 300 based at least in part on the obtained configuration content. Further, in an embodiment, a control unit, such as control unit 303, may obtain content from a decision-making system, such as decision-making system 340, or from one or more external sources, such as external system 350.

Although example behavioral processing unit 300 is depicted having particular memory devices, such as memories 304, 312, 314, and/or 316, other embodiments may include memory elements distributed in various areas of the processing unit. For example, memory elements may be included in one or more sensor processing units 305 and/or in one or more machine-learning units 306. Additionally, a memory, such as memory 304, may be implemented as a hierarchy of memory devices and/or technologies that may allow for various sizes and/or memory access speeds. Further, a memory, such as memory 304, may store machine-learning weighting parameters and/or other machine-learning parameters, and/or may also store control signals, for example.

In an embodiment, a control unit, such as control unit 303, may generate one or more output signals and/or states, such as one or more control signal, based, at least in part, on inputs obtained by the control unit. Control signal output generation may be a function of one or more inputs that may include, for example, user identification parameters, content type parameters, contextual parameters, task parameters, sensor availability parameters, or behavioral profile content specification parameters, or any combination thereof. Of course, these are merely example types of inputs that may be obtained by a control unit, such as control unit 303, and claimed subject matter is not limited in scope to these particular examples.

As mentioned, a control unit, such as control unit 303, may obtain user parameters 315 that may include user identification content and/or other parameters descriptive of a particular user). Further, in an embodiment, a control unit, such as control unit 303, may obtain parameters descriptive of content being consumed by a user (e.g., music, movie, game, digital book, etc.), parameters descriptive of a task being performed by a user, or parameters descriptive of context and/or environment, or any combination thereof, for example. In an embodiment, context and/or environmental parameters 311 may be provided by and/or obtained from an external system, such as external system 350. Further, in an embodiment, content and/or task parameters 310 may be provided by and/or obtained from a decision-making system, such as decision-making system 340. For example, parameters descriptive of content type may indicate that a user is listening to and/or otherwise consuming music as opposed to participating in an interactive game. Further, for example, parameters descriptive of user/operator and/or task may indicate a type of task being performed (e.g., flying, driving, performing surgery, etc.) and/or may indicate a particular user/operator. Also, for example, parameters descriptive of context and/or environment may indicate a particular setting (e.g., location, time of day, date, etc.), presence of other individuals, or other contextual information, or any combination thereof.

A control unit, such as control unit 303, may also obtain parameters, such as parameters 314, that may be indicative of sensor availability, for example. Additionally, a control unit, such as control unit 303, may obtain parameters, such as parameters 319, that may indicate one or more particular parameters and/or parameter types of behavioral profile content, such as behavioral profile content 325, to be generated on a relative priority basis, for example, by machine-learning stage 302, for example. Further, one or more parameters 320 representative of one or more aspects of behavioral profile content 325 generated by machine-learning stage 302 may be provided to and/or obtained by a control unit, such as control unit 303. For example, parameters 320 may include feedback to control unit 303 that may influence behavioral processing unit operations, in an embodiment.

As mentioned, a control unit, such as control unit 303, may generate one or more control signals based, at least in part, on inputs that may be obtained from any of a range of sources. For example, inputs obtained by control unit 303 may allow for selecting particular content from one or more memory elements, such as one or more of memories 304, 312, 314, and/or 316, to be utilized in configuring sensor processing stage 301 and/or machine-learning stage 302 for processing. For example, sensor processing stage 301 and/or machine-learning stage 302 may be configured based on a particular user/operator, a particular task, or a particular context, or a combination thereof. By tailoring processing in this manner, improved behavioral profile content may be generated, and/or efficiency may be improved (e.g., improved confidence of behavioral profile content while utilizing relatively fewer resources). Further, in an embodiment control unit 303 may steer outputs of sensor processing stage 301 (e.g., intermediary results) to particular machine-learning units 305 via control of steering circuitry 308 based, at least in part, on inputs obtained by control unit 303. Similarly, control unit 303 may select output from one or more particular machine-learning units 306 via control of steering/selecting circuitry 307 based, at least in part, on obtained inputs. Further, weighting of inputs for machine-learning units 306 may be determined at least in part based on obtained inputs. For example, a control unit, such as control unit 303, may steer, select, and/or weight intermediary results (e.g., content generated by sensor processing stage 301) as a function of user/operator identification, content type, environmental context, or sensor availability, or any combination thereof, in an embodiment. Of course, claimed subject matter is not limited in scope in these respects.

Further, in an embodiment, resource allocation within a processor, such as behavioral processing unit 300, may be based, at least in part, on behavioral profile content specification parameters, such as parameters 319. In an embodiment, a control unit, such as control unit 303, may obtain behavioral profile content specification parameters 319 that may indicate one or more behavioral profile parameters to be relatively prioritized, for example, and may select particular sensor processing units 305 and/or particular machine-learning units 306 based, at least in part, on the specified behavioral profile content parameters. "Relatively prioritized" in the context of behavioral profile content specification parameters, such as parameters 319, refers to one or more particular parameters to be processed on a priority basis over other parameters. For example, behavioral profile content specification parameters 319 may indicate an "anger" parameter. Resources (e.g., SPUs 305, machine-learning units 306, memory, etc.) sufficient to process the "anger" parameter to a particular confidence level, for example, may be allocated, even at the expense of resources that may otherwise be allocated to generating other behavioral profile content parameters. Control unit 303 may, via one or more control signals, select resources from sensor processing stage 301 and/or machine-learning stage 302 to generate behavioral profile content in accordance with the specified parameters. In this manner, relatively prioritized content may be generated relatively more efficiently. Behavioral profile content specification parameters, such as parameters 319, may also indicate relative priorities related to trade-offs between power consumption and generation of particular behavioral profile content, in an embodiment. Further, in an embodiment, relatively prioritized content may be generated at the relative expense of other behavioral profile content. For example, behavioral profile parameters indicating anger and/or fatigue may be relatively prioritized over excitement and/or hunger parameters, and control unit 303 may configure sensor processing stage 301 and/or machine-learning stage 302 accordingly. Further, in an embodiment, self-feedback and/or output monitoring content, such as content 320, may allow for control adjustments, such as selecting additional/different machine-learning units and/or sensor processing units and/or otherwise adjusting resource utilization within behavioral processing unit 300. Such adjustments may be made, for example, to meet specified relative priorities, specified levels of confidence in generated output, etc.

Although some embodiments described herein mention neural network techniques for machine learning, subject matter is not limited in scope in this respect. Other embodiments may incorporate other machine learning techniques either presently existing or to be developed in the future. Further, for embodiments implementing neural networks, for example, sensors may be removed from a system during offline pre-deployment training operations such that a neural network may determine appropriate weights for various sensor combinations. In another embodiment, during online operation, for example, a set of input biomarkers may be logged and/or later used as training parameters, wherein a predicted behavioral processing unit output may be utilized at least in part to train one or more networks that may lack some subset of the initial inputs. For online inference, an appropriate network may be selected based at least in part on available sensor inputs. Such an arrangement may be advantageous in situations wherein an operator may remove one or more sensors from a system, device, and/or process. For example, during surgery, a surgeon may remove his or her glasses that may have been tracking eye movement. In an embodiment, a different neural network configuration may be selected at least in part in response to such a change in available sensor input, for example. For example, a control unit, such as control unit 303, may detect a change in sensor availability (e.g., signified by sensor availability input 314), and/or may reconfigure sensor processing units 305 and/or machine-learning units 306 based at least in part on the detected change in sensor availability.

Figure 4:
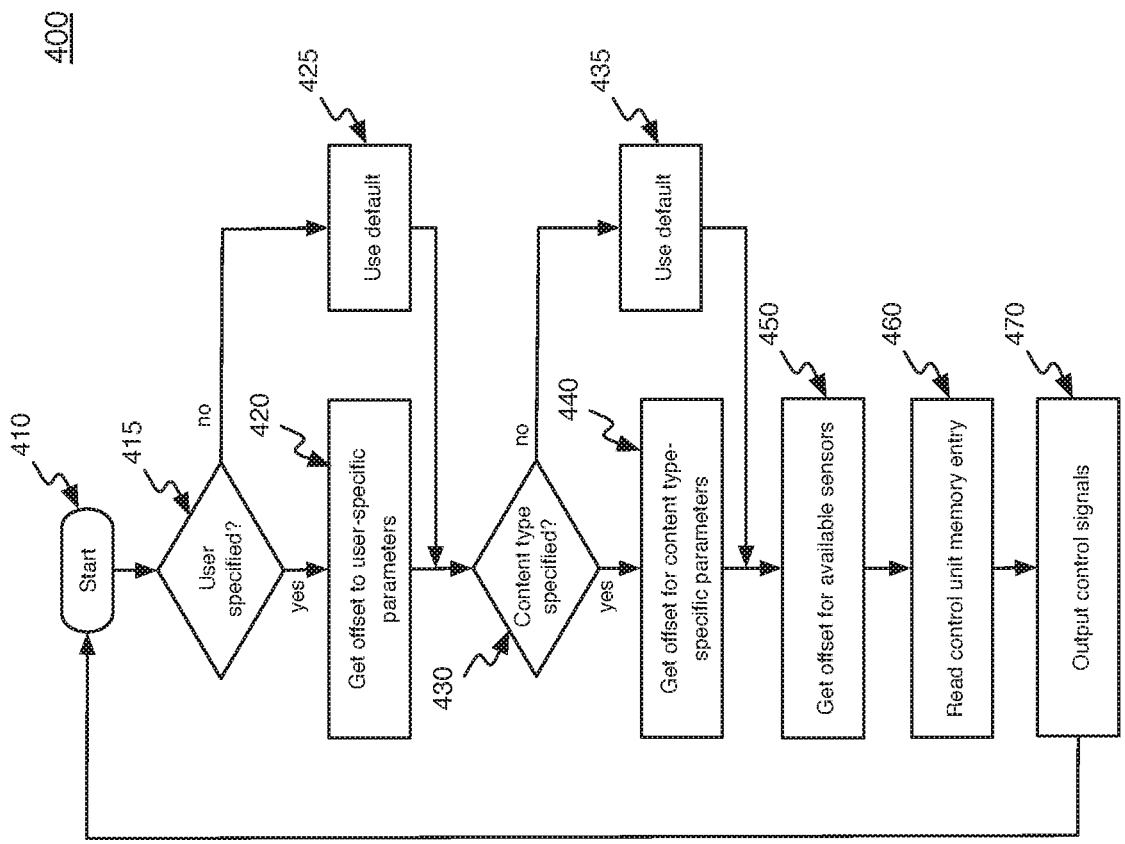
FIG. 4 is an illustration of an example process for generating behavioral profile content, in accordance with an embodiment.

FIG. 4 is an illustration of an embodiment 400 of an example process for generating behavioral profile content. Embodiments in accordance with claimed subject matter may include all of blocks 410-470, fewer than blocks 410-470, and/or more than blocks 410-470. Further, the order of blocks 410-470 is merely an example order, and claimed subject matter is not limited in scope in these respects.

In an embodiment, one or more parameters descriptive of a particular user/operator (e.g., user ID), one or more parameters descriptive of content being consumed by a user, or one or more parameters indicative of sensor availability, or any combination thereof, may be obtained by a behavioral processing unit, such as behavioral processing unit 300. In an embodiment, a behavioral processing unit, such as behavioral processing unit 300, may configure and/or reconfigure one or more aspects of the behavioral processing unit based, at least in part, on obtained parameters. For example, beginning at block 410, an example process for configuring a behavioral processing unit, such as behavioral processing unit 300, is described.

As indicated at block 415, a determination may be made as to whether a particular user/operator has been specified. As mentioned, a particular user may be identified via one or more descriptive parameters, such as parameters 315, obtained by a control unit, such as control unit 303. At least in part in response to a determination that no particular user/operator has been specified, default configuration parameters may be utilized, as indicated at block 425. At least in part in response to a determination that a particular user/operator has been specified, a particular memory offset parameter for the particular user/operator may be obtained. For example, a control unit, such as control unit 303, may obtain an offset specified for the identified user/operator from a memory.

Further, as indicated at block 430, a determination may be made as to whether a particular content type (e.g., type of content being consumed by a particular user) has been specified. In an embodiment, a particular content type may be identified via one or more parameters, such as parameters 309, obtained by a control unit, such as control unit 303. At least in part in response to a determination that no particular content type has been specified, a default configuration parameters related to content type may be utilized, as indicated at block 435. At least in part in response to a determination that a particular content type has been specified, a particular memory offset parameter for the particular content type may be obtained. For example, a control unit, such as control unit 303, may obtain an offset specified for the identified content type from a memory.

In an embodiment, one or more parameters indicative of sensor availability may be specified. For example, a control unit, such as control unit 303, may obtain one or more parameters 314 indicative of sensor availability. In an embodiment, a memory offset parameter may be obtained based on the indicated sensor availability. In an embodiment, the availability and/or non-availability of particular sensors and/or sensor types may result in different behavioral processing unit configurations.

As indicated at block 460, for example, a control unit, such as control unit 303, may perform a read operation from one or more memory locations indicated by the one or more offset parameters obtained in response to obtaining user-specific parameters, content-type parameters, and/or sensor availability parameters to obtain configuration parameters for a behavioral processing unit, such as 300. In an embodiment, one or more control signals may be generated, such as indicated at block 470, thereby configuring, at least in part, one or more aspects of a behavioral processing unit, such as 300. For example, based at least in part on generated control signals, one or more particular sensor processing units, such as 305, and/or one or more particular machine-learning units, such as 306, may be selected for sensor content processing and/or behavioral profile content generation operations. Further, control signals may, via content steering circuitry, direct sensor content to particular sensor processing units, may direct intermediate results generated by sensor processing units to particular machine-learning units, and/or may select outputs of particular machine-learning units, for example.

Figure 5:
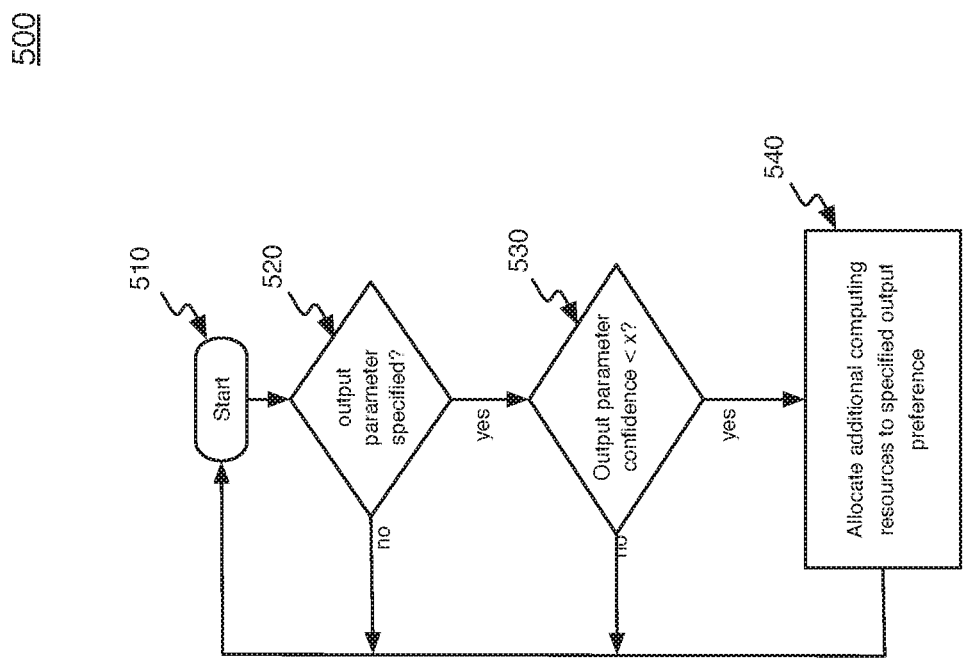
FIG. 5 is an illustration of an example process for generating behavioral profile content, in accordance with an embodiment.

FIG. 5 is an illustration of an embodiment 500 of an example process for generating behavioral profile content. Embodiments in accordance with claimed subject matter may include all of blocks 510-540, fewer than blocks 510-540, and/or more than blocks 510-540. Further, the order of blocks 510-540 is merely an example order, and claimed subject matter is not limited in scope in these respects.

In an embodiment, one or more parameters indicative of one or more particular output parameters (e.g., prioritized behavioral profile content parameters) may be obtained by a behavioral processing unit, such as behavioral processing unit 300. In an embodiment, a behavioral processing unit, such as 300, may configure and/or reconfigure one or more aspects of the behavioral processing unit based, at least in part, on obtained parameters. For example, beginning at block 510, an example process for configuring a behavioral processing unit, such as behavioral processing unit 300, is described.

As indicated at block 520, a determination may be made as to whether a particular output parameter relative priority has been specified. As mentioned, particular behavioral content parameters, for example, may be specified as being relatively prioritized via one or more parameters, such as parameters 319, obtained by a control unit, such as control unit 303. Further, at least in part in response to a determination that a relatively prioritized output parameter has been specified, an additional determination may be made as to whether the relatively prioritized output parameter fails to meet or exceed a specified confidence parameter, as indicated at block 530.

In an embodiment, as indicated at block 540, for example, additional resources, such as additional and/or different sensor processing units 305, additional and/or different machine-learning units 306, or any combination thereof, may be allocated to processing sensor content and/or generating specified behavioral profile content. In an embodiment, one or more control signals may be generated thereby re-configuring, at least in part, one or more aspects of a behavioral processing unit, such as behavioral processing unit 300. For example, based at least in part on generated control signals, one or more particular additional and/or different sensor processing units, such as sensor processing units 305, and/or one or more particular additional and/or different machine-learning units, such as machine-learning units 306, may be allocated for sensor content processing and/or behavioral profile content generation.

Figure 6:
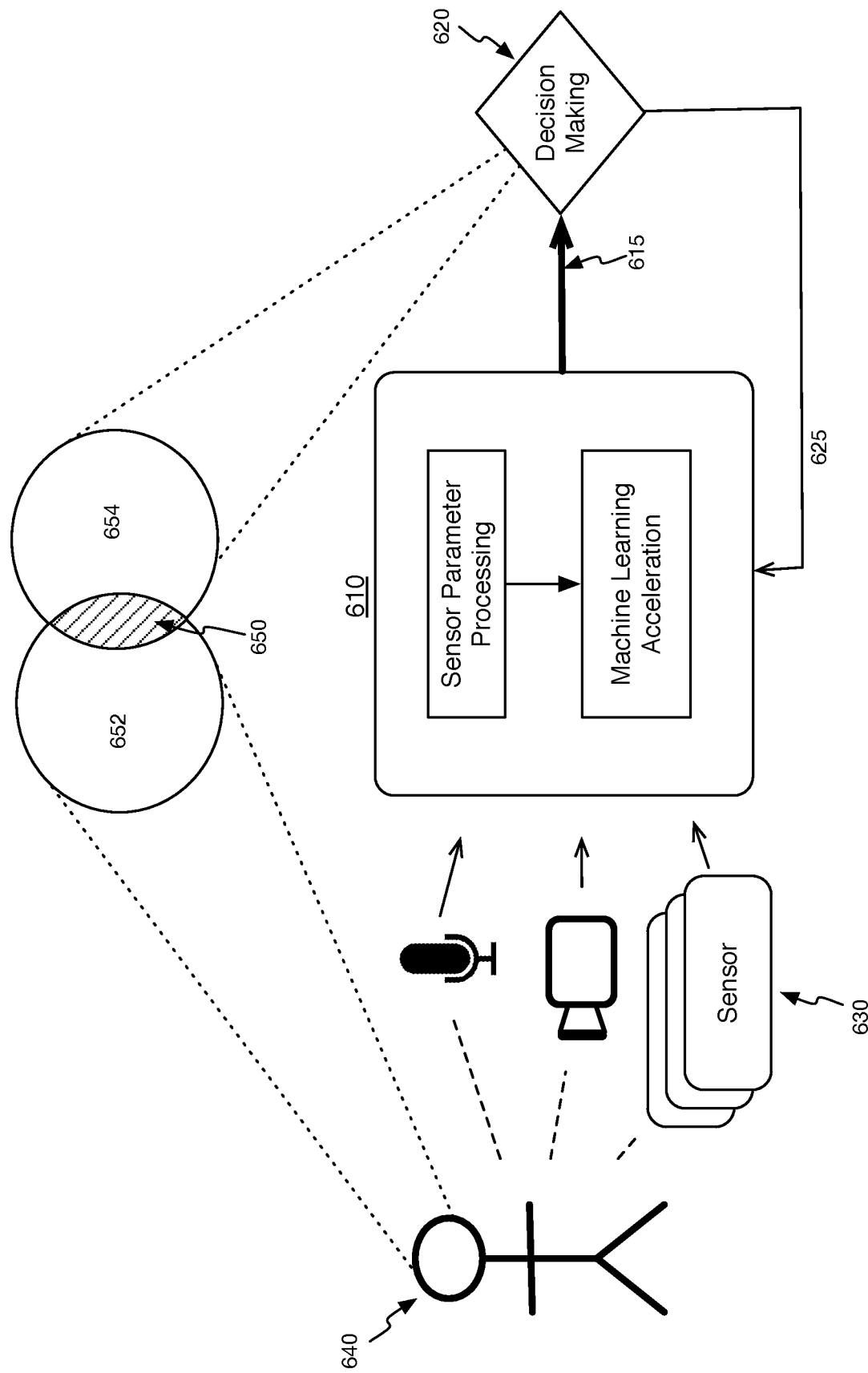
FIG. 6 is an illustration of an example device, system, and/or process for processing signals and/or states representative of behavioral content, in accordance with an embodiment.

FIG. 6 is an illustration of an embodiment 600 of an example device, system, and/or process for processing signals and/or states representative of behavioral content, in accordance with an embodiment. In an embodiment, to generate behavioral profile content, such as behavioral profile content 615, for a particular operator, such as operator 640, a processor, such as behavioral processing unit 610, may obtain signals and/or states representative of content from one or more sensors, such as one or more of sensors 630. Also, in an embodiment, a processor, such as behavioral processing unit 610, may process sensor content, such as content from one or more of sensors 630, to generate behavioral profile content, such as behavioral profile content 615, for a particular operator, such as operator 640.

In an embodiment, a computing device-based decision-making system, device, and/or process, such as system 620, may include machine learning and/or artificial intelligence techniques. Behavioral profile content, such as behavioral profile content 615, may include a plurality of parameters representative of focal point, excitement, anger, fear, fatigue, dehydration, and/or focus/distraction, for example. In an embodiment, various aspects of behavioral profile content may individually include vectors of parameters. For example, an "anger" vector may include parameters indicating a particular state, a score related to that state, a confidence parameter, and/or a direction and/or trend parameter, in an embodiment. Also, in an embodiment, a computing device-based decision-making system, device, and/or process, such as system 620, may provide calibration and/or hint parameters, such as parameters 625, to a processor, such as behavioral processing unit 610, although, again, subject matter is not limited in scope in these respects.

Also, in an embodiment, a processor, such as behavioral processing unit 610, may repetitively and/or continuously obtain sensor content and/or may repetitively and/or continuously generate behavioral profile content for particular operators. For example, sensor content may be gathered and/or otherwise obtained at regular intervals, and/or behavioral profile content may be generated at regular intervals. In an embodiment, a computing device-based decision-making system, device, and/or process, such as system 620, may track behavioral profile content over a period of time, for example, to detect changes in behavioral profile content.

As mentioned, embodiments may include processing of signals and/or states representative of sensor content. In at least some embodiments, sensor content may comprise analog signals and/or digital signals, or a combination thereof. Further, although digital processing circuitry may be described in connection with various example embodiments, subject matter is not limited to digital implementations. For example, embodiments may implement analog circuitry for processing sensor content. Similarly, signals and/or states that may be generated to control operation of a machine, for example, may comprise digital and/or analog signals and/or states, or a combination thereof. In an embodiment, analog hysteretic "winner-take-all" circuits may be implemented at least in part to improve noise robustness and/or to mitigate, at least in part, timing difference between sensor input streams, for example. Of course, subject matter is not limited in scope in these respects.

As mentioned, embodiments may be utilized in situations that may benefit from substantially real-time determination of a biological and/or behavioral state of a particular operator, including, for example, technology-assisted driving and/or flying, such as in commercial and/or military scenarios. Of course, subject matter is not limited to these particular examples. In an embodiment, responsibility for operating one or more aspects of a particular machine may shift from operator to computing device depending, at least in part, on a substantially current biological and/or behavioral state of a particular operator. For example, FIG. 6 depicts an area of responsibility, illustrated as area 654, under control of a computing device decision-making system, device, and/or process, such as 620. FIG. 6 also depicts an area of responsibility, illustrated as area 652, under control of a particular operator, such as operator 640. Area 650, also depicted in FIG. 6, illustrates an area of shared responsibility between a computing device-based decision-making system, device, and/or process, such as 620, and operator-based control, such as by operator 640. In an embodiment, whether a particular operator, such as operator 640, and/or a computing device-based decision-making system, device, and/or process, such as system 620, performs tasks illustrated by area 650 may depend, at least in part, on a substantially current biological and/or behavioral state of the particular operator. In an embodiment, such a determination may be made, at least in part, by a computing device-based decision-making system, device, and/or process, such as system 620, based at least in part on behavioral profile content, such as behavioral profile content 615, obtained from a processor, such as behavioral processing unit 600, for example.

Returning to an example of an operator, such as a pilot, flying an aircraft, the operator may control some aspects of the aircraft while a computing device-based decision-making system, device, and/or process, such as system 620, controls other aspects of the aircraft. For the current example, an area of variable responsibility, such as area of variable responsibility 650, may represent one or more aspects of aircraft operation that may be shifted at least in part from pilot control to computing device control depending at least in part on a substantially current biological and/or behavioral state of the pilot. For example, if a processor, such as behavioral processing unit 610, detects at least in part via sensor content that the pilot is fatigued, agitated, angry, etc. beyond specified thresholds, for example, responsibility and/or operation of flight controls (e.g., rudder, elevators, etc.) may be shifted from pilot control to control by computing device-based decision-making system, device, and/or process, such as system 620.

In another example, shared responsibility area 650 may represent an automobile braking system that may, under normal conditions, be under at least partial control of a particular operator. At least in part in response to a processor, such as behavior processing unit 610, generating behavioral profile content for a particular operator that indicates a change in a substantially current biological and/or behavioral state for the particular operator that may indicate a dangerous condition for the operator and/or for others, a computing device-based decision-making system, device, and/or process, such as system 620, may assume control of the braking system. Of course, subject matter is not limited to these particular examples.

In a further example, anesthesia during a surgical procedure may be administered to a patient in accordance with a computing device-based decision-making system, device, and/or process, such as system 620. In an embodiment, a surgeon may comprise an "operator" in that the surgeon may be monitored via one or more sensors. Administration of anesthesia may be initially based, at least in part, on an expected duration of the surgical procedure. A processor, such as behavioral processing unit 610, may generate behavioral profile content for the surgeon, and a computing device-based decision-making system, device, and/or process, such as system 620, may determine whether administration of anesthesia should be altered based on a current biological and/or behavioral state of the surgeon. For example, behavioral profile content may indicate an increase is stress levels being experienced by the surgeon, and/or may indicate an acknowledgement by the surgeon of an error during the procedure. A computing device-based decision-making system, device, and/or process, such as system 620, may determine to alter administration of anesthesia based on an anticipated increase in expected duration of the surgical procedure due at least in part to the increased stress levels and/or detected error acknowledgement, for example.

Figure 7:
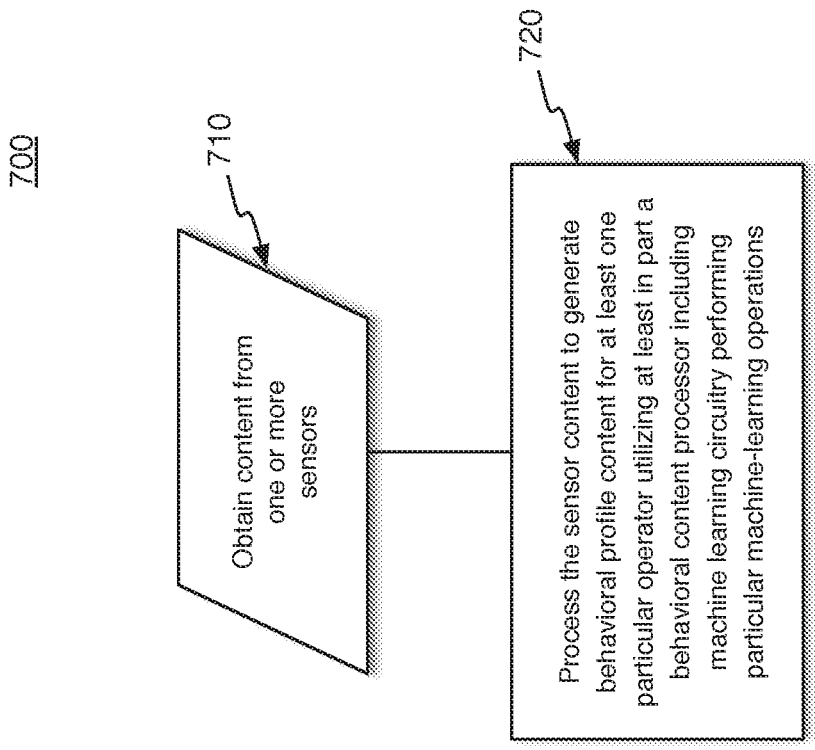
FIG. 7 is an illustration of an example process for processing signals and/or states representative of behavioral content, in accordance with an embodiment.

FIG. 7 is an illustration of an embodiment 700 of an example process for processing signals and/or states representative of behavioral content. Embodiments in accordance with claimed subject matter may include all of blocks 710-720, fewer than blocks 710-720, and/or more than blocks 710-720. Further, the order of blocks 710-720 is merely an example order, and claimed subject matter is not limited in scope in these respects.

As indicated at block 710, content may be obtained from one or more sensors, such as sensors 330. Sensor content may be processed to generate behavioral profile content for at least one particular operator, as indicated at block 720, for example. As described above, sensor content, such as signals and/or states obtained from sensors 330, may be processed by a behavioral processing units, such as behavioral processing unit 300, that may include, for example, one or more sensor processing units, such as SPUs 305, and/or one or more machine-learning units, such as machine-learning units 306. In an embodiment, sensor content may be processed at least in part by a behavioral profile content processor, such as behavioral processing unit 300, that may include machine learning acceleration circuitry, for example. For example, a behavioral processing unit, such as behavioral processing unit 300, may include one or more machine-learning units, such as machine-learning units 306, as described above. Further, in an embodiment, a behavioral content processor and/or machine learning acceleration circuitry, for example, may perform one or more particular operations to generate behavioral profile content. In an embodiment, one or more particular operations performed at least in part by machine-learning units, such as machine-learning units 306, for example, may include multiplication, square/power, multiplicative inverse, and/or partial product operations, or any combination thereof, that may be performed on sets of parameters in accordance with one or more of a wide range of possible machine-learning techniques.

Figure 8:
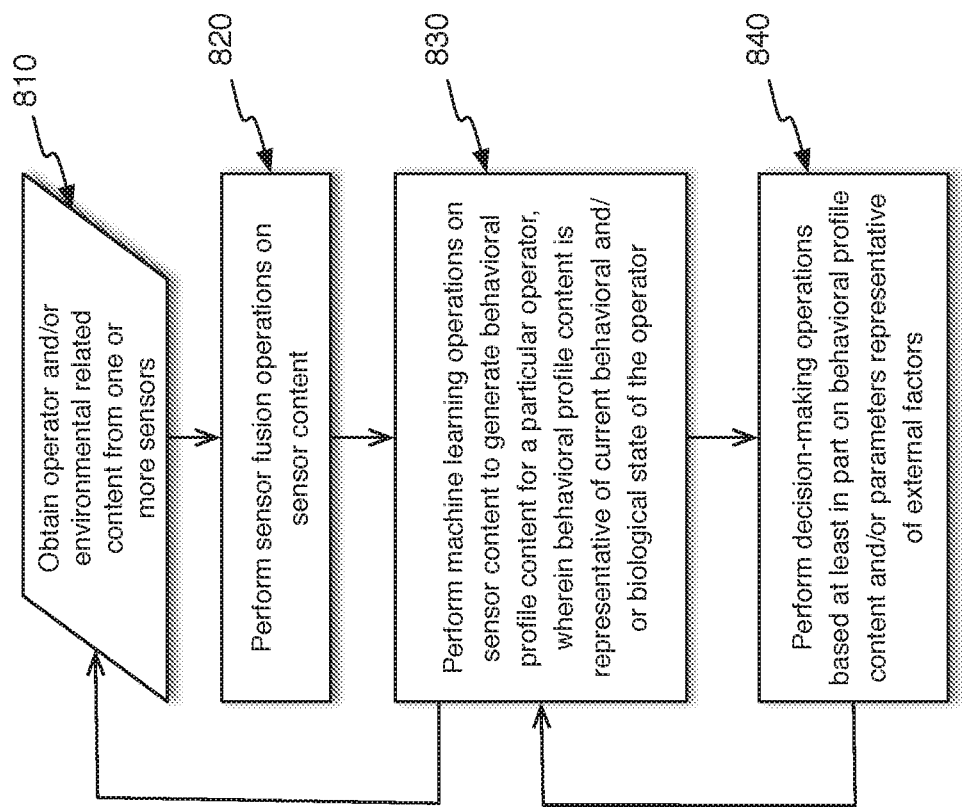
FIG. 8 is an illustration of an example process for processing signals and/or states representative of behavioral content, in accordance with an embodiment.

FIG. 8 is an illustration of an embodiment 800 of an example process for processing signals and/or states representative of behavioral content. Embodiments in accordance with claimed subject matter may include all of blocks 810-840, fewer than blocks 810-840, and/or more than blocks 810-840. Further, the order of blocks 810-840 is merely an example order, and claimed subject matter is not limited in scope in these respects.

In an embodiment, content related to a particular operator and/or environmental-related content may be obtained from one or more sensors, as indicated at block 810. As further indicated at block 820, sensor fusion operations may be performed on sensor content. In an embodiment, sensor fusion operations may include combining, normalizing, reducing, and/or otherwise processing sensor content in preparation for further processing by machine learning operations, for example, such as discussed above in connection with sensors 330 and/or SPUs 305. In an embodiment, machine learning operations, such as discussed above in connection with machine-learning units 306, for example, may be performed on sensor content to generate behavioral profile content for a particular operator, as indicated at block 830. In an embodiment, machine learning operations may include one or more particular operations that may be performed by machine learning acceleration circuitry, such as machine-learning units 306, of a behavioral processing unit, such as behavioral processing unit 300, for example. In an embodiment, particular operations may include calculations performing multiplication, square/power, multiplicative inverse, and/or partial product operations, or any combination thereof.

In an embodiment, behavioral profile content, such as behavioral profile content 325, for example, may be representative of a substantially current behavioral and/or biological state of the particular operator, as also indicated at block 830. Further, as depicted at block 840, decision-making operations based at least in part on behavioral profile content and/or parameters representative of one or more external factors may be performed, such as discussed above in connection with decision-making system 340, for example.

In an embodiment, a behavioral processing unit, such as behavioral processing unit 300, for example, may represent an improvement over other approaches, such as may include the use of general purpose processing devices. For example, specialized and/or dedicated circuitry, such as control circuit 303, SPUs 305, machine-learning units 306, etc., may more efficiently generate content, such as behavioral profile content, based at least in part on sensor content, such as sensor content 330. In an embodiment, dedicated and/or specialized circuitry, such as behavioral processing unit 300, for example, may consume relatively less power and/or less energy, may be implemented within a relatively small area on a semiconductor die, may be more responsive to changes in sensor content, may more quickly, accurately, and/or reliably generate behavioral profile content. For example, specialized hardware, such as example embodiments described herein, may provide for generation of relatively more accurate behavioral profile content as compared to what may be possible with general-purpose hardware.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later. Also, the term "connection" may be utilized in a context of a neural network model, and may, in an embodiment, refer to parameters passed between nodes that may include parameters and/or sets of parameters representative of output values, for example. Also, in an embodiment, connections between nodes may include weight parameters. For example, one or more weight parameters may operate in a specified manner on one or more parameters representative of one or more output values to yield a connection, such as between a node of a first layer and a node of a second layer, in an embodiment, for example.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 9:
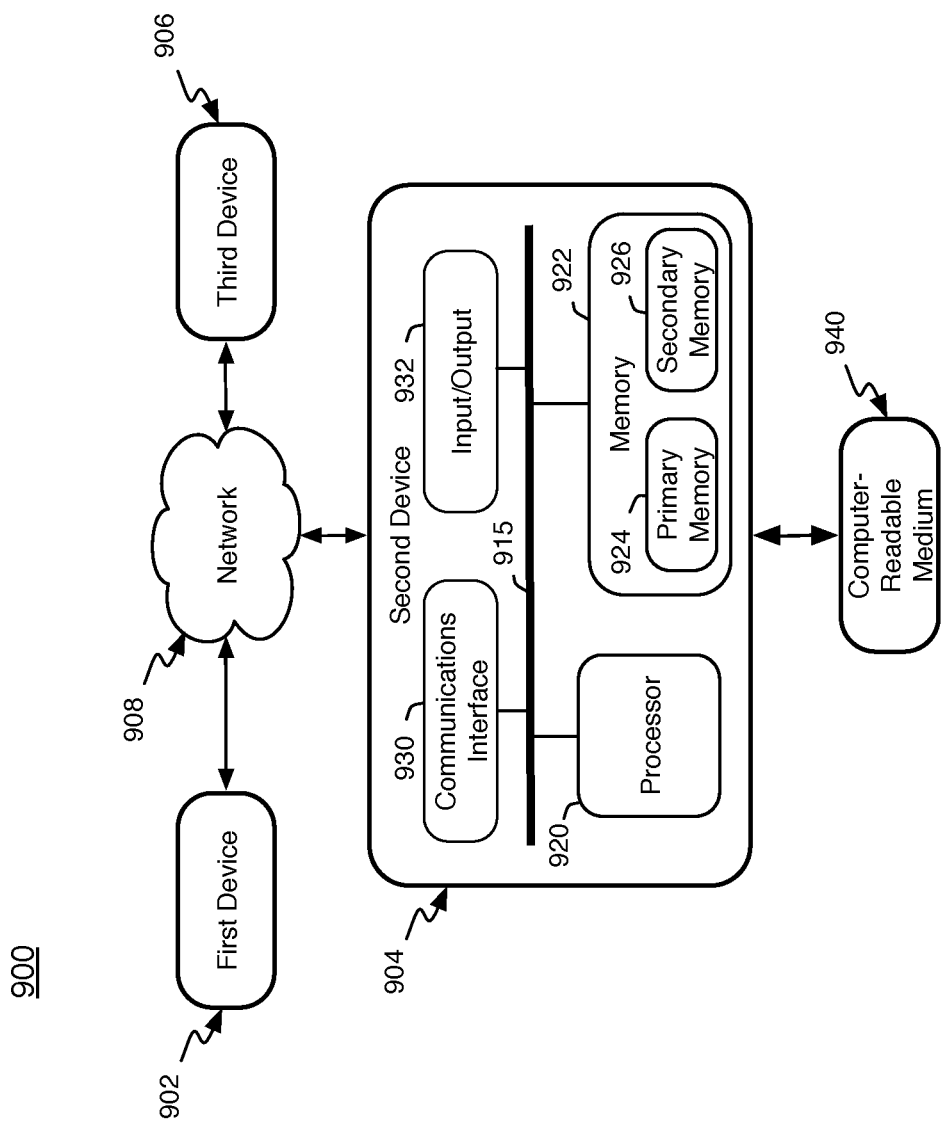
FIG. 9 is a schematic block diagram of an example computing device, in accordance with an embodiment.

In one example embodiment, as shown in FIG. 9, a system embodiment may comprise a local network (e.g., device 904 and medium 940) and/or another type of network, such as a computing and/or communications network. For purposes of illustration, therefore, FIG. 9 shows an embodiment 900 of a system that may be employed to implement either type or both types of networks. Network 908 may comprise one or more network connections, links, processes, services, applications, and/or resources to facilitate and/or support communications, such as an exchange of communication signals, for example, between a computing device, such as 902, and another computing device, such as 906, which may, for example, comprise one or more client computing devices and/or one or more server computing device. By way of example, but not limitation, network 908 may comprise wireless and/or wired communication links, telephone and/or telecommunications systems, Wi-Fi™ networks, Wi-MAX™ networks, the Internet, a local area network (LAN), a wide area network (WAN), or any combinations thereof.

Example devices in FIG. 9 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-9, for example, and in the text associated with the foregoing figure(s) of the present patent application.

In an embodiment, an apparatus may include at least one memory to store sensor content including signals and/or states obtained from one or more sensors. Behavioral content processing circuitry, including machine-learning circuitry to perform one or more particular machine-learning operations, may process sensor content to generate behavioral profile content for at least one particular operator.

Further, in an embodiment, sensor content processing circuitry may include a plurality of configurable sensor content processing units to individually perform particular sensor content processing operations. Also, machine-learning circuitry may include a plurality of configurable machine learning units to individually perform particular machine-learning techniques, in an embodiment. Additionally, individual sensor content processing units or individual machine-learning units, or a combination thereof, may be configurable at least in part in accordance one or more control signals generated by control circuitry at least in part in response to one or more sensor availability parameters, one or more sensor type parameters, one or more parameters descriptive of a particular user, one or more environmental parameters, one or more behavioral profile content specification parameters, or one or more parameters to be obtained from a decision-making system, or any combination thereof. In an embodiment, individual sensor content processing units may combine, adjust timing, reduce noise, convert from digital to analog, convert from analog to digital, or normalize, or any combination thereof, one or more of signals and/or states obtained from the one or more sensors.

In an embodiment, behavioral profile content for at least one particular operator may comprise a plurality of parameters representative of a substantially current behavioral state or biological state, or a combination thereof, of the at least one particular operator. A plurality of parameters representative of the substantially current behavioral state or biological state, or a combination thereof, of at least one particular operator may include one or more parameters representative of focal point, excitement, anger, fear, fatigue, dehydration, or focus/distraction, or any combination thereof. Further, a plurality of parameters representative of a substantially current behavioral state or biological state, or a combination thereof, of at least one particular operator may include one or more parameters representative of pre-breakthrough, silent like, regret/error acknowledgment, hunger, sloppiness/precision, empathy, or social engagement level, or any combination thereof.

In an embodiment, behavioral content processing circuitry to generate the behavioral profile content repetitively. Also, one or more sensors may include at least one camera, at least one microphone, at least one perspiration and/or temperature sensor, at least one pressure sensor, at least one heart rate monitor, at least one hydration sensor, or at least one breath sensor, or any combination thereof. Further, behavioral content processing circuitry may process sensor content from at least one microphone to generate one or more parameters representative of volume, tone, or sentiment, or any combination thereof. Behavioral content processing circuitry may process sensor content from at least one camera to generate one or more parameters representative of pupil dilation, focal point, blink duration, or blink rate, or any combination thereof, for example. Additionally, machine-learning circuitry may process content representative of one or more characteristics of a particular operator or user-generic content, or a combination thereof, to train a machine learning parameter set, in an embodiment An embodiment in accordance with claimed subject matter may include a method of executing computer instructions on at least one computing device without further human interaction in which the at least one computing device includes at least one processor and at least one memory. An embodiment may include fetching computer instructions from the at least one memory of the at least one computing device for execution on the at least one processor of the at least one computing device, executing the fetched computer instructions on the at least one processor of the at least one computing device, and storing in the at least one memory of the at least one computing device any results of having executed the fetched computer instructions on the at least one processor of the at least one computing device. In an embodiment, the computer instructions to be executed comprise instructions for processing sensor content, wherein executing the fetched instructions further includes obtaining one or more signals and/or states representative of sensor content from one or more sensors, and processing, utilizing at least in part the at least one processor, the sensor content to generate behavioral profile content for a particular operator. In an embodiment, the at least one processor may comprise a behavioral content processor and/or may comprise machine learning acceleration circuitry. Further, in an embodiment, machine learning acceleration circuitry may perform particular operations to generate behavioral profile content.

In an embodiment, the behavioral profile content for the at least one particular operator may include a plurality of parameters representative of a substantially current behavioral state or biological state, or a combination thereof, of the particular operator. A plurality of parameters representative of a substantially current behavioral state or biological state, or a combination thereof, of a particular operator may include one or more parameters representative of focal point, excitement, anger, fear, fatigue, dehydration, focus/distraction, pre-breakthrough, silent like, regret/error acknowledgment, hunger, sloppiness/precision, empathy, or social engagement level, or any combination thereof.

In an embodiment, processing the sensor content to generate behavioral profile content for the particular operator may include repetitively processing the sensor content to update the behavioral profile content. In an embodiment, repetitively processing sensor content may include processing sensor content at specified intervals.

In an embodiment, processing sensor content may include processing content obtained from at least one microphone to generate one or more parameters representative of volume, tone, or sentiment, or any combination thereof. Processing sensor content may further include processing content obtained from at least one camera to generate one or more parameters representative of pupil dilation, focal point, blink duration, or blink rate, or any combination thereof.

Additionally, in an embodiment, processing sensor content may include processing content representative of one or more characteristics of a particular operator or user-generic content, or a combination thereof, to train a machine learning parameter set. In an embodiment, a machine learning parameter set may include a plurality of neural network weight parameters.

Referring now again to FIG. 9, in an embodiment, first and third devices 902 and 906 may be capable of rendering a graphical user interface (GUI) for a network device and/or a computing device, for example, so that a user-operator may engage in system use. Device 904 may potentially serve a similar function in this illustration. Likewise, in FIG. 9, computing device 902 ('first device' in figure) may interface with computing device 904 ('second device' in figure), which may, for example, also comprise features of a client computing device and/or a server computing device, in an embodiment. Processor (e.g., processing device) 920 and memory 922, which may comprise primary memory 924 and secondary memory 926, may communicate by way of a communication bus 915, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 904, as depicted in FIG. 9, is merely one example, and claimed subject matter is not limited in scope to this particular example.

As mentioned, for one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Microsoft Windows®, iOS®, Linux®, a mobile operating system, such as iOS, Android™ Windows Mobile®, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook®, LinkedIn®, Twitter®, Flickr®, and/or Google+®, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 9, computing device 902 may provide one or more sources of executable computer instructions in the form physical states and/or signals (e.g., stored in memory states), for example. Computing device 902 may communicate with computing device 904 by way of a network connection, such as via network 908, for example. As previously mentioned, a connection, while physical, may not necessarily be tangible. Although computing device 904 of FIG. 9 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 922 may comprise any non-transitory storage mechanism. Memory 922 may comprise, for example, primary memory 924 and secondary memory 926, additional memory circuits, mechanisms, or combinations thereof may be used. Memory 922 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 922 may be utilized to store a program of executable computer instructions. For example, processor 920 may fetch executable instructions from memory and proceed to execute the fetched instructions. Memory 922 may also comprise a memory controller for accessing device readable-medium 940 that may carry and/or make accessible digital content, which may include code, and/or instructions, for example, executable by processor 920 and/or some other device, such as a controller, as one example, capable of executing computer instructions, for example. Under direction of processor 920, a non-transitory memory, such as memory cells storing physical states (e.g., memory states), comprising, for example, a program of executable computer instructions, may be executed by processor 920 and able to generate signals to be communicated via a network, for example, as previously described. Generated signals may also be stored in memory, also previously suggested.

Memory 922 may store electronic files and/or electronic documents, such as relating to one or more users, and may also comprise a computer-readable medium that may carry and/or make accessible content, including code and/or instructions, for example, executable by processor 920 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 9, processor 920 may comprise one or more circuits, such as digital circuits, to perform at least a portion of a computing procedure and/or process. By way of example, but not limitation, processor 920 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 920 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 9 also illustrates device 904 as including a component 932 operable with input/output devices, for example, so that signals and/or states may be appropriately communicated between devices, such as device 904 and an input device and/or device 904 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising:
a processor dedicated to generating a specified set of parameters representative of an operator's physical, mental and/or emotional state, wherein the processor to comprise:
behavioral content processing circuitry to generate the specified set of parameters representative of the operator's physical, mental, and/or emotional state, wherein the behavioral content processing circuitry to comprise:
a plurality of configurable machine-learning circuits;
a plurality of configurable sensor content processing circuits to condition signals and/or states received from one or more sensors for further processing by the plurality of configurable machine-learning circuits;
a control circuit to select a first combination of one or more sensor content processing circuits of the plurality of configurable sensor content processing circuits and one or more machine-learning circuits of the plurality of configurable machine-learning circuits based at least in part on one or more signals and/or signal packets, obtained from a first decision-making system of one or more decision-making systems, specifying an adjustment to a specified priority for a first parameter of the specified set of parameters representative of the operator's physical, mental and/or emotional state; and
circuitry to determine whether a value for the first parameter of the specified set of parameters fails to meet a specified confidence parameter;
wherein the control circuit further to select a second combination comprising at least two sensor content processing circuits of the plurality of configurable sensor content processing circuits and further comprising at least two machine-learning circuits of the plurality of configurable machine-learning circuits based at least in part on a determination that the value for the first parameter of the specified set of parameters failed to meet the specified confidence parameter; and
circuitry to transmit one or more signals and/or signal packets representative of the specified set of parameters representative of the operator's physical, mental and/or emotional state to the first decision-making system.

2. The apparatus of claim 1, wherein the plurality of configurable sensor content processing circuits to respectively perform a plurality of particular sensor content processing operations.

3. The apparatus of claim 2, wherein the plurality of configurable machine-learning circuits to respectively perform a plurality of particular machine-learning techniques.

4. The apparatus of claim 3, wherein individual sensor content processing circuits of the plurality of configurable sensor content processing circuits or individual machine-learning circuits of the plurality of configurable machine-learning circuits, or a combination thereof, are configurable at least in part in accordance with one or more control signals generated by the control circuit at least in part in response to one or more sensor type parameters, one or more parameters descriptive of the operator, one or more environmental parameters, one or more behavioral profile content specification parameters, or one or more additional parameters to be obtained from the one or more decision-making systems, or any combination thereof.

5. The apparatus of claim 2, wherein, to condition the signals and/or states received from the one or more sensors for further processing by the plurality of configurable machine-learning circuits, individual sensor content processing circuits of the plurality of configurable sensor content processing circuits to combine, adjust timing, reduce noise, convert from digital to analog, convert from analog to digital, or normalize, or any combination thereof, the signals and/or states received from the one or more sensors.

6. The apparatus of claim 1, wherein the specified set of parameters representative of the operator's physical, mental and/or emotional state comprises a specified set of parameters representative of a current behavioral state and biological state of the operator.

7. The apparatus of claim 1, wherein the specified set of parameters representative of the operator's physical, mental and/or emotional state to include one or more parameters representative of focal point, excitement, anger, fear, fatigue, dehydration, or focus/distraction, or any combination thereof.

8. The apparatus of claim 1, wherein the specified set of parameters representative of the operator's physical, mental and/or emotional state to include one or more parameters representative of regret/error acknowledgment, hunger, sloppiness/precision, empathy, or social engagement level, or any combination thereof.

9. The apparatus of claim 1, wherein the behavioral content processing circuitry to generate the specified set of parameters representative of the operator's physical, mental and/or emotional state repetitively.

10. The apparatus of claim 1, wherein the one or more sensors to include at least one camera, at least one microphone, at least one perspiration and/or temperature sensor, at least one pressure sensor, at least one heart rate monitor, at least one hydration sensor, or at least one breath sensor, or any combination thereof.

11. The apparatus of claim 10, wherein the behavioral content processing circuitry to process one or more signals and/or states from the at least one microphone to generate one or more parameters representative of volume, tone, or sentiment, or any combination thereof.

12. The apparatus of claim 11, wherein the behavioral content processing circuitry to process one or more signals and/or states from the at least one camera to generate one or more parameters representative of pupil dilation, focal point, blink duration, or blink rate, or any combination thereof.

13. The apparatus of claim 3, wherein the plurality of configurable machine-learning circuits to process content representative of one or more characteristics of the operator or user-generic content, or a combination thereof, to train a machine-learning parameter set.

14. A method, comprising:
at a processor dedicated to generating a specified set of parameters representative of an operator's physical, mental and/or emotional state:
obtaining one or more signals and/or states representative of sensor content from one or more sensors;
processing the sensor content to generate the specified set of parameters representative of the operator's physical, mental and/or emotional state, including:
obtaining, from a first decision-making system of one or more decision- making systems, one or more signals and/or signal packets indicating an adjustment to a specified priority for a first parameter of the specified set of parameters representative of the operator's physical, mental and/or emotional state;
selecting, by a control circuit of the processor, a first combination of one or more sensor content processing circuits of a plurality of configurable sensor content processing circuits and one or more machine-learning circuits of a plurality of configurable machine-learning circuits based at least in part on the one or more signals and/or signal packets indicating the adjustment to the specified priority for the first parameter of the specified set of parameters representative of the operator's physical, mental and/or emotional state;
determining whether a value for the first parameter of the specified set of parameters fails to meet a specified confidence parameter;
selecting, by the control circuit of the processor, a second combination comprising at least two sensor content processing circuits of the plurality of configurable sensor content processing circuits and further comprising at least two machine-learning circuits of the plurality of configurable machine-learning circuits based at least in part on a determination that the value for the first parameter of the specified set of parameters failed to meet the specified confidence parameter; and
providing the specified set of parameters representative of the operator's physical, mental and/or emotional state to the first decision-making system of the one or more decision-making systems.

15. The method of claim 14, wherein the specified set of parameters representative of the operator's physical, mental and/or emotional state includes one or more parameters representative of a current behavioral state and biological state of the operator.

16. The method of claim 14, wherein the plurality of configurable machine-learning circuits to respectively perform a plurality of particular machine-learning operations.

17. The method of claim 16, further comprising selecting at least one of the plurality of particular machine-learning operations for processing the one or more signals and/or states generated by the selected combination of the one or more sensor content processing circuits of the plurality of configurable sensor content processing circuits based, at least in part, on an identity of the operator.

18. The method of claim 14, wherein the specified set of parameters representative of the operator's physical, mental and/or emotional state includes one or more parameters representative of focal point, excitement, anger, fear, fatigue, dehydration, focus/distraction, regret/error acknowledgment, hunger, sloppiness/precision, empathy, or social engagement level, or any combination thereof.

19. The method of claim 14, wherein the processing the sensor content to generate the specified set of parameters representative of the operator's physical, mental and/or emotional state comprises repetitively processing the sensor content to update the specified set of parameters representative of the operator's physical, mental and/or emotional state.

20. The method of claim 19, wherein the repetitively processing the sensor content comprises processing the sensor content at specified intervals of time.

21. The method of claim 14, wherein the processing the sensor content comprises processing one or more signals and/or states obtained from at least one microphone to generate one or more parameters representative of volume, tone, or sentiment, or any combination thereof.

22. The method of claim 14, wherein the processing the sensor content comprises processing one or more signals and/or states obtained from at least one camera to generate one or more parameters representative of pupil dilation, focal point, blink duration, or blink rate, or any combination thereof.

23. An apparatus, comprising:
a processor to include behavioral content processing circuitry dedicated to generating a specified set of parameters representative of an operator's physical, mental and/or emotional state, and wherein the behavioral content processing circuitry comprises:
circuitry to obtain one or more signals and/or states representative of sensor content from one or more sensors; and
circuitry to process the sensor content to generate the specified set of parameters representative of the operator's physical, mental and/or emotional state, wherein the circuitry to process the sensor content to include:
circuitry to obtain, from a first decision-making system of one or more decision-making systems, one or more signals and/or signal packets indicating an adjustment to a specified priority for a first parameter of the specified set of parameters representative of the operator's physical, mental and/or emotional state;

a control circuit to select a first combination of one or more sensor content processing circuits of a plurality of configurable sensor content processing circuits and one or more machine-learning circuits of a plurality of configurable machine- learning circuits based at least in part on the one or more signals and/or signal packets indicating the adjustment to the specified priority for the first parameter of the specified set of parameters representative of the operator's physical, mental and/or emotional state;

circuitry to determine whether a value for the first parameter of the specified set of parameters fails to meet a specified confidence parameter;

wherein the control circuit further to select a second combination comprising at least two sensor content processing circuits of the plurality of configurable sensor content processing circuits and further comprising at least two machine-learning circuits of the plurality of configurable machine-learning circuits based at least in part on a determination that the value for the first parameter of the specified set of parameters failed to meet the specified confidence parameter; and a communications interface to transmit the specified set of parameters representative of the operator's physical, mental and/or emotional state to the first decision-making system of the one or more decision-making systems.

24. The apparatus of claim 23, wherein the specified set of parameters representative of the operator's physical, mental and/or emotional state to include one or more parameters representative of focal point, excitement, anger, fear, fatigue, dehydration, focus/distraction, regret/error acknowledgment, hunger, sloppiness/precision, empathy, or social engagement level, or any combination thereof.

25. The apparatus of claim 1, wherein the circuitry to transmit the one or more signals and/or signal packets representative of the specified set of parameters representative of the operator's physical, mental and/or emotional state to the first decision-making system of the one or more decision-making systems to control, at least in part, operation of a particular machine to affect safety of the operator or one or more other individuals or a combination thereof.

* * * * *